(12) United States Patent
Kawano

(10) Patent No.: US 6,340,252 B1
(45) Date of Patent: Jan. 22, 2002

(54) LIGHT-QUANTITY CONTROLLING DEVICE AND APPARATUS USING THE SAME

(75) Inventor: Kenji Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/590,191

(22) Filed: Jun. 9, 2000

(30) Foreign Application Priority Data

Jun. 14, 1999 (JP) .......................................... 11-167132

(51) Int. Cl.[7] .............................. G03B 9/08; G03B 9/40; G03B 9/02
(52) U.S. Cl. ....................... 396/450; 396/463; 396/507; 396/485
(58) Field of Search ................................. 396/355, 449, 396/450, 483, 484, 507, 508, 463, 485

(56) References Cited

U.S. PATENT DOCUMENTS

| | | | | |
|---|---|---|---|---|
| 3,980,407 A | * | 9/1976 | Hill | .............................. 355/71 |
| 5,687,417 A | * | 11/1997 | Furlani et al. | .............. 396/449 |
| 6,086,267 A | * | 7/2000 | Tsuzuki et al. | .............. 396/459 |

\* cited by examiner

Primary Examiner—David M. Gray
Assistant Examiner—Rochelle Blackman
(74) Attorney, Agent, or Firm—Fitzpatrick, Cella, Harper & Scinto

(57) ABSTRACT

A light-quantity controlling device includes a driving source, a first light-quantity controlling member driven by the driving source and having a first elongated opening extending in a direction of movement of the first light-quantity controlling member, and a second light-quantity controlling member driven by the driving source in a direction substantially perpendicular to the direction of movement of the first light-quantity controlling member and having a second elongated opening extending in the direction of movement of the second light-quantity controlling member. The light-quantity controlling device also includes a supporting member configured to support the first and second light-quantity controlling members and having an opening therein. The first and second elongated openings intersect each other at the opening provided in the supporting member when the first and second light-quantity controlling members are driven by the driving source.

32 Claims, 19 Drawing Sheets

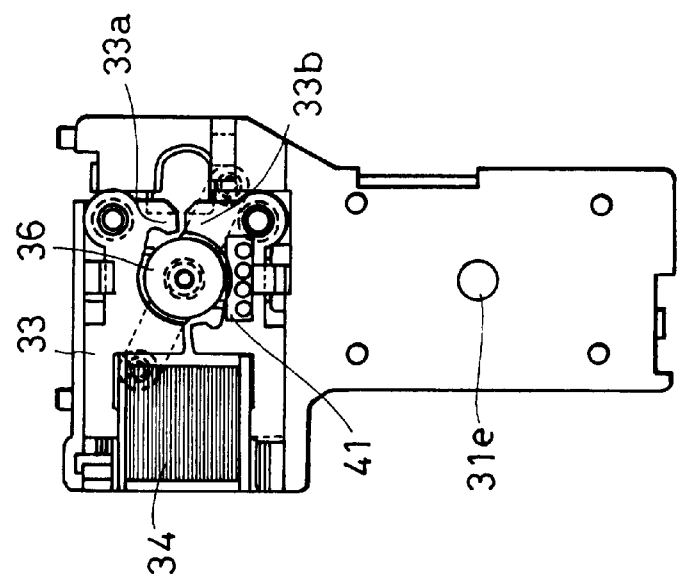
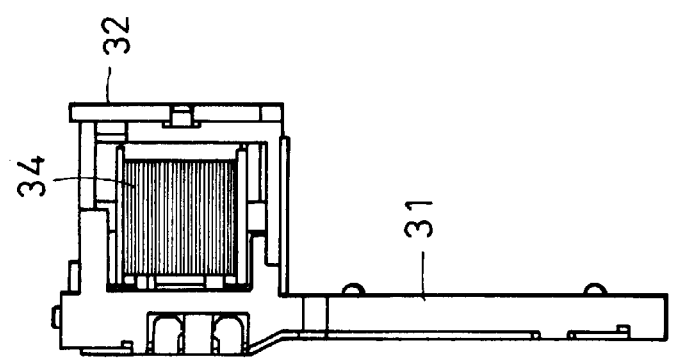
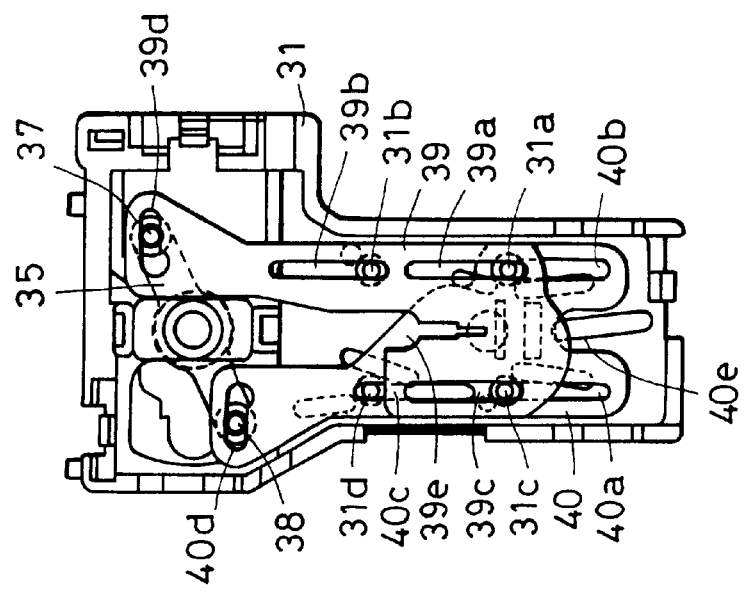

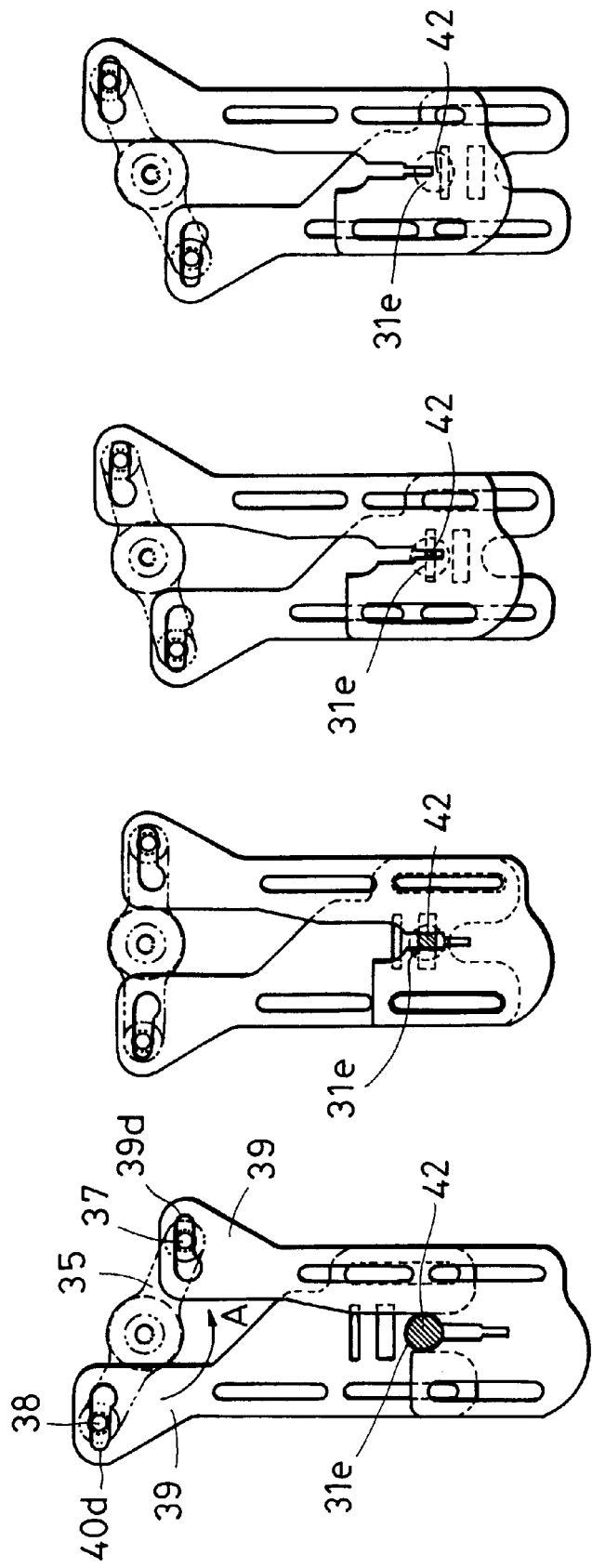

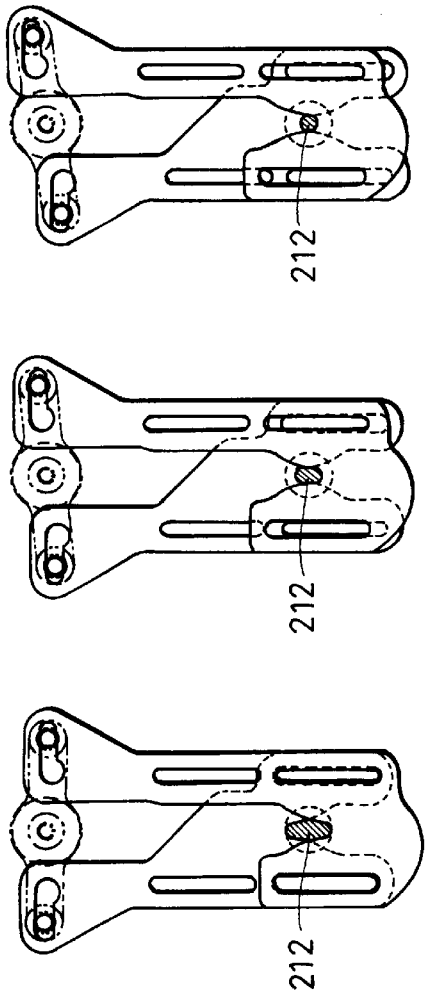
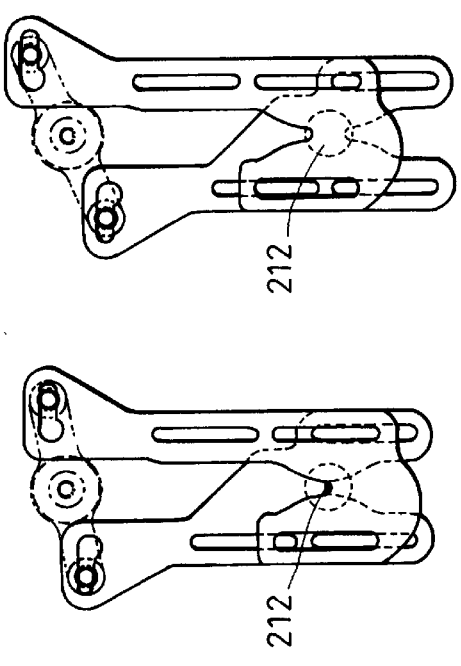
PRIOR ART
FIG. 21A FIG. 21B FIG. 21C FIG. 21D
FIG. 21E FIG. 21F FIG. 21G

FIG. 22
PRIOR ART

|  | F2.5 (FULL APERTURE) | F5.6 | F8.0 | F11 | F16 |
|---|---|---|---|---|---|
| APERTURE DIAMETER Φ(mm) | 5.24 | 2.31 | 1.64 | 1.16 | 0.82 |
| APERTURE AREA S(mm²) | 21.56 | 4.20 | 2.10 | 1.05 | 0.53 |
| VARIATION DUE TO PLAY (%) | ± 3.8 | ± 8.7 | ± 11.3 | ± 16.0 | ± 22.5 |
| VARIATION DUE TO PLAY (EV-VALUE) | + 0.05 / − 0.06 | + 0.12 / − 0.13 | + 0.15 / − 0.17 | + 0.21 / − 0.25 | + 0.29 / − 0.37 |

FIG. 23 PRIOR ART

| | F2.5 (FULL APERTURE) | F5.6 | F8.0 | F11 | F16 |
|---|---|---|---|---|---|
| APERTURE DIAMETER Φ(mm) | 2.0 | 0.88 | 0.63 | 0.44 | 0.32 |
| APERTURE AREA S(mm²) | 3.14 | 0.61 | 0.31 | 0.15 | 0.08 |
| VARIATION DUE TO PLAY (%) | ± 10.0 | ± 21.7 | ± 29.0 | ± 39.5 | ± 52.5 |
| VARIATION DUE TO PLAY (EV-VALUE) | + 0.14 / − 0.15 | + 0.28 / − 0.35 | + 0.37 / − 0.49 | + 0.49 / − 0.72 | + 0.60 / − 1.07 |

# LIGHT-QUANTITY CONTROLLING DEVICE AND APPARATUS USING THE SAME

BACKGROUND OF THE INVENTION

1. Field of the Invention

The present invention relates to a device for controlling the quantity of light to be used in an apparatus, such as a video camera, a still video camera, or a copying machine.

2. Description of the Related Art

Hitherto, multimedia tools for handling not only voice and alphabetic information but also image information data have been widely used. Among these multimedia tools, video cameras and digital cameras are generally used for recording the image information. Recently, by using a portable terminal, such as a mobile phone or a handheld computer, having a small integrated camera as an image-capture device, image data can be transmitted through a telephone line immediately after image capture.

Camera units of these image-capture devices are generally configured with a single focal lens unit or a zoom lens unit including lenses in a common axial system of a size suitable for each image-capture element.

FIG. 19 shows a typical known digital camera. The known digital camera includes a camera body 101, an optical part 102, an electronic flash unit 103, a release button 104, and a liquid crystal display (LCD) 105 for confirming data. The camera body 101 includes a viewfinder, an LCD for confirming recording, and the like, at the back thereof.

The optical part 102 includes a lens barrel, lenses, an image-capture element, and a diaphragm unit (light-quantity controlling unit). Incident rays from an object are led to the image-capture element through the lenses and the diaphragm unit. By an electrical circuit which is not shown, a proper diaphragm stop number and a shutter speed are determined, whereby the most appropriate exposure is performed.

In order to perform the most suitable exposure, the diaphragm stop number must be controlled in accordance with the brightness of the object. For this purpose, most video cameras generally have iris galvanometers as diaphragm units. The basic configuration of the iris galvanometer is described with reference to FIGS. 20A, 20B, and 20C.

FIGS. 20A to 20C are schematic sectional views of a known iris galvanometer. FIG. 20A is a front view, FIG. 20B is a side view, and FIG. 20C is a rear view of the known iris galvanometer.

The iris galvanometer shown in FIGS. 20A to 20C includes a casing 201, a yoke 202 formed substantially in a U-shape and made of a magnetic material, and windings 203 having conductive wires around the yoke 202, the windings 203 being connected to an electrical circuit (not shown). The iris galvanometer also includes a rotor 204 having a permanent magnet 205 and is disposed rotatably between the ends of the yoke 202. The rotor 204 is provided with two protrusions 206 and 207 at the ends of arms thereof.

The iris galvanometer includes movable blades 208 and 209 having holes 210 and 211, respectively, the blades 208 and 209 mating with the protrusions 206 and 207 at the holes 210 and 211, respectively. The blades 208 and 209 slidingly move along directions parallel to each other in the casing 201.

With reference to FIGS. 21A to 21G, the operation of the iris galvanometer, in which the size of an aperture varies, is described below.

When electric current is applied to the windings 203, the rotor 204 is rotated by a magnetic circuit in response to the current value, whereby the relative position of the movable blades 208 and 209 varies. By the movement of the blades 208 and 209, the size of an aperture 212 (the shaded portion) defined by edges of the movable blades 208 and 209 is determined, the size of the aperture 212 corresponding to each diaphragm stop number.

FIG. 21A shows the aperture 212 having a full aperture value of F2.5; FIG. 21B shows the aperture 212 having a size corresponding to F4.0; FIG. 21C shows the aperture 212 having a size corresponding to F5.6; FIG. 21D shows the aperture 212 having a size corresponding to F8.0; FIG. 21E shows the aperture 212 having a size corresponding to F11.0; FIG. 21F shows the aperture 212 having a size corresponding to F16.0; and FIG. 21G shows the aperture 212 completely closed.

As shown in these drawings, the diaphragm stop number is determined according to the rotational orientation of the rotor 204. Each edge of the movable blades 208 and 209 defining the aperture 212 is formed so that the diaphragm stop number varies continuously.

Due to the recent technological advances, components and elements used in information terminal devices have been remarkably reduced in size. In particular, charge coupled devices (CCD) as image-capture elements have been significantly miniaturized. Therefore, it is particularly important to miniaturize lenses, diaphragm units associated therewith, and the like. Because the focal distance of a lens is reduced in accordance with the reduction in the size of image-capture elements, the full aperture of the lens must be reduced when designing a lens having the same specifications. Accordingly, the aperture of a diaphragm must be further reduced, thereby causing a problem in the configuration of a known iris galvanometer.

The problem of the known iris galvanometer is that a slight play exists in the mating parts of the holes 210 and 211 provided in the movable blades 208 and 209 with the associated protrusions 206 and 207 of the rotor 204 because it is difficult to completely eliminate gaps therefrom. A play of approximately 0.1 mm is generally produced in a normal production of the known iris galvanometers in which the movable blades 208 and 209 must move smoothly. The movable blades 208 and 209 do not follow the rotational movement of the rotor 204 in the range of the play of approximately 0.1 mm.

In the past, the lens was large and had a full aperture ranging from 6 to 8 mm in diameter because image-capture elements were large. Therefore, the play of 0.1 mm was a relatively small value.

Recently, image-capture elements have become small, thereby reducing the full aperture. Known iris galvanometers generally have a full aperture of not less than 4.0 mm in diameter.

FIG. 22 is a table showing the relationship between the F-number of a lens having a full aperture of 5.24 mm in diameter and an aperture area S of 21.56 mm$^2$, and the variation in the aperture area S when the play is 0.1 mm. The amount of variation (%) in the aperture area S is considered by dividing the play of 0.1 mm into two values with respect to the center value thereof, that is ±0.05 mm, the amount of variation becoming greater as the diameter of the aperture becomes smaller. The variation in exposure value (EV-value) in relation to the amount of variation (%) is also shown in the table.

The shape of the aperture is determined according to the shape of the edges of the movable blades defining the aperture. Therefore, the aperture is not always formed as a circle between the full-aperture state and the completely-closed state. However, the amount of variation in the aperture area due to the play is computed by dividing the play into two values by conveniently considering the shape of the aperture as always being a circle.

As shown in FIG. 22, when the full aperture is large, the play of 0.1 mm does not significantly affect the diaphragm stop number. The variation in the EV-value is a maximum of 0.25 when the F-number is 11, and a maximum of 0.37 when the F-number is 16, which is not a problem in practical use.

As the aperture is closed, the image quality of a lens is reduced due to the effect of diffraction. Therefore, in a general lens unit, the mechanical minimum diaphragm stop number is set in a range of F8 to F11. Below this, the minimum diaphragm stop number is obtained optically by reducing the quantity of light by using a neutral density (ND) filter or the like. In this case, the aperture size can be reduced slightly more because the mechanical accuracy in the minimum diaphragm stop number must be ensured only down to the range of F8 to F11. However, such a method using a ND filter or the like for reducing the quantity of light has a disadvantage in that a desired image-capture effect cannot be obtained because the depth of field does not vary by actuating a diaphragm. The method is not optimal from the photographer's point of view.

When the full aperture is reduced due to the miniaturization of image-capture elements, the play of 0.1 mm strongly affects the variation in the aperture area. In FIG. 23, for a full aperture of 2 mm in diameter, the relationship between the F-number and the aperture area S and the variation in the aperture area as a percentage and in the EV-value are shown when the play is 0.1 mm. The amount of variation (%) in the aperture area S is considered by dividing the play of 0.1 mm into two values with respect to the center value thereof, that is ±0.05 mm, the amount of variation becoming greater as the diameter of the aperture becomes smaller. The aperture is not always formed as a circle between the full-aperture state and the completely-closed state, the shape of the aperture being determined by the shape of the edges of the movable blades defining the aperture. However, the amount of variation due to the play is computed by dividing the play into two values by conveniently considering the shape of the aperture as always being a circle.

As shown in FIG. 23, when the full aperture is reduced, the play of 0.1 mm strongly affects the diaphragm stop number. The variation in the EV-value is a maximum of 0.72 when the F-number is 11, and a maximum of 1.07 when the F-number is 16, thereby causing a problem in the exposure accuracy.

When an EV-value is set to not higher than 0.3 so as not to cause the problem in the exposure accuracy, only the F-number of 5.6 or lower can be applied, whereby a problem is caused in that the device cannot be applied to a high-brightness object.

In order to overcome the above-described problems, a diaphragm mechanism is known in which a rotatable blade having a plurality of apertures rotates and changes the size of aperture in steps (a turret-type diaphragm). However, it is difficult to reduce the size of a diaphragm mechanism of this type, and the structure thereof is complex because a particular driving mechanism is required when the diaphragm mechanism is used as a mechanical shutter.

SUMMARY OF THE INVENTION

Accordingly, a primary object of the present invention is to provide a light-quantity controlling device and an apparatus using the same, which overcome the above-described problems of known devices and apparatuses.

To this end, in an aspect of the invention, a light-quantity controlling device comprises a driving source; a first light-quantity controlling member driven by the driving source, and having a first elongated opening extending in a direction of movement of the first light-quantity controlling member; a second light-quantity controlling member driven by the driving source in a direction substantially perpendicular to the direction of movement of the first light-quantity controlling member, and having a second elongated opening extending in the direction of movement of the second light-quantity controlling member; and a supporting member configured to support the first and second light-quantity controlling members, and having an opening therein. The first and second elongated openings intersect each other at the opening provided in the supporting member when the first and second light-quantity controlling members are driven by the driving source.

The quantity of light can be controlled by the two light-quantity controlling members, supported by the supporting member having an opening, and being driven in directions substantially perpendicular to each other so that the two elongated openings intersect each other at the opening provided in the supporting member.

Further objects, features and advantages of the present invention will become apparent from the following description of the preferred embodiments with reference to the attached drawings.

BRIEF DESCRIPTION OF THE DRAWINGS

FIGS. 11A, 11B, and 11C are a front view, a side view, and a rear view, respectively, of an iris galvanometer according to a third embodiment of the present invention;

FIGS. 12A, 12B, 12C, and 12D are views of the operation of the iris galvanometer according to the third embodiment;

FIGS. 21A, 21B, 21C, 21D, 21E, 21F, and 21G are views showing the operation of the known iris galvanometer;

FIG. 22 is a table showing the relationship between the F-number and the amount of play, etc., in a known iris galvanometer; and FIG. 23 is a table showing the relationship between the F-number and the amount of play, etc., in a known iris galvanometer.

DESCRIPTION OF THE PREFERRED EMBODIMENTS

First Embodiment

Figures 1, 2:
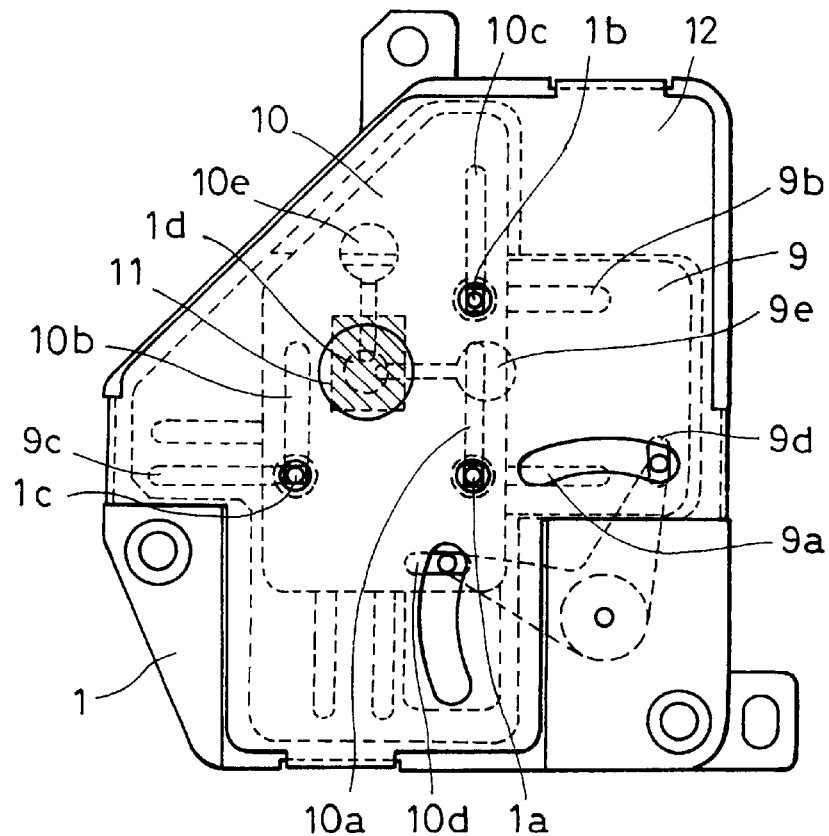
FIG. 1 is a front view of an iris galvanometer according to a first embodiment of the present invention.
FIG. 2 is a front view of a driving unit of the iris galvanometer shown in FIG. 1.

FIGS. 1 and 2 show an iris galvanometer (light-quantity controlling device) according to a first embodiment of the present invention. FIG. 1 principally shows movable blades and a rotor, and FIG. 2 principally shows the rotor, a yoke, and windings. In the present embodiment, the movable blades and the rotor are described separately, as shown in FIG. 1 and FIG. 2, respectively, for describing individual functions thereof, although the movable blades and the rotor integrally constitute the iris galvanometer according to the embodiment.

The iris galvanometer shown in FIGS. 1 and 2 includes a first casing 1 and a second casing 2. The iris galvanometer includes a yoke 3 made of a magnetic material and formed substantially in a U-shape, conductive windings 4 around the yoke 3 connected to an electrical circuit (not shown), and a rotatable rotor 5 having a permanent magnet 6, the rotor 5 being disposed between the ends of the yoke 3. The rotor 5 is provided with two arms having protrusions 7 and 8 at the ends thereof. The two arms having the protrusions 7 and 8 form an angle of approximately 90 degrees with the rotational center of the rotor 5 therebetween.

The rotor 5 includes a rotating shaft (not shown) extending along the rotational axis to couple with bearing units (not shown) provided on the first and second casings 1 and 2, whereby the rotor 5 is rotatably supported. The permanent magnet 6 having a predetermined orientation is fixed to the rotor 5 at the center thereof.

The iris galvanometer according to the embodiment includes a first movable blade 9 which is movable horizontally (transversely in the drawing). The first movable blade 9 is provided with elongated holes 9a, 9b, and 9C formed therein, for restricting the horizontal movement of the first movable blade 9 in a predetermined range. The first movable blade 9 is also provided with a hole 9d in the vicinity of an edge thereof, at which the first movable blade 9 mates with the protrusion 7 of the rotor 5. The first movable blade 9 is driven horizontally, as shown in FIG. 1, in the casings 1 and 2, by the rotation of the rotor 5.

Figure 7:
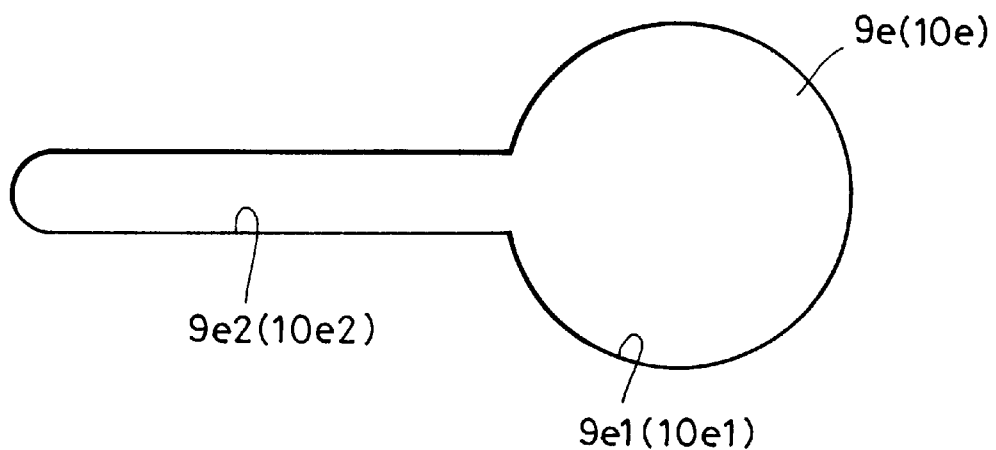
FIG. 7 is an expanded view of an aperture formed in each of the movable blades shown in FIGS. 3 to 6.

The first movable blade 9 is provided with a central opening 9e substantially at the center thereof. The central opening 9e moves as the first movable blade 9 is driven, so that the first movable blade 9 functions as a diaphragm for restricting the quantity of light. As shown in FIG. 7, the central opening 9e includes a circular opening (full aperture part) 9e1 provided at an end thereof and an elongated opening 9e2 extending continuously from the circular opening 9e1 in the direction of movement (horizontal direction) of the first movable blade 9.

The iris galvanometer according to the embodiment includes a second movable blade 10 which is vertically movable, as shown in FIG. 1. The second movable blade 10 is provided with elongated holes 10a, 10b, and 10c formed therein as guides for restricting the vertical movement of the second movable blade 10 in a predetermined range. The second movable blade 10 is provided with a hole 10d in the vicinity of an edge thereof, with which the second movable blade 10 mates with the protrusion 8 of the rotor 5. The second movable blade 10 is driven vertically, as shown in FIG. 1, in the casings 1 and 2, by the rotation of the rotor 5.

The second movable blade 10 is provided with a central opening 10e substantially at the center thereof. The central opening 10e moves as the second movable blade 10 is driven, so that the second movable blade 10 functions as a diaphragm for restricting the quantity of light. As shown in FIG. 7, the central opening 10e includes a circular opening (full aperture part) 10e1 provided at an end thereof and an elongated opening 10e2 extending continuously from the circular opening 10e1 in the direction of movement (vertical direction) of the second movable blade 10. The size and the like of the central opening 10e formed in the second movable blade 10 are substantially the same as those of the central opening 9e formed in the first movable blade 9. A ND filter 11 is bonded, as shown by slanted lines in FIG. 1, to the second movable blade 10 at the end of the elongated opening 10e2, opposite to the circular opening 10e1, by an adhesive material such as an adhesive tape.

The iris galvanometer includes a Hall element 13 and a supporting plate 12 disposed in the casing 1 so as to support the first and second movable blades 9 and 10. The Hall element 13, included in a control circuit (not shown) of a device including the iris galvanometer, detects a magnetic leakage flux from the permanent magnet 6 fixed to the rotor 5, thereby detecting the rotational orientation of the rotor 5.

The first casing 1 is provided with three protrusions 1a, 1b, and 1c which mate with the elongated holes 9a, 9b, and 9c, respectively, of the first movable blade 9, and guide the first movable blade 9 in the horizontal directions The protrusions 1a, 1b, and 1c also mate with the elongated holes 10a, 10b, and 10c, respectively, of the second movable blade 10, and guide the second movable blade 10 in the vertical direction.

The first casing 1 is provided with a circular opening Id substantially at the center thereof. The area of the circular opening 1d is the same as the area of the full aperture of the iris galvanometer. The iris galvanometer is disposed in an optical system described below, so that the center of the circular opening 1d is disposed at an optical axis.

The above-described iris galvanometer operates as follows. By applying an electric current to the windings 4, a magnetic field is generated and magnetic poles N and S opposing each other are produced at ends 3a and 3b of the yoke 3. The permanent magnet 6 fixed to the rotor 5 is attracted and repelled by the generated magnetic field, thereby rotating the rotor 5.

Figure 3:
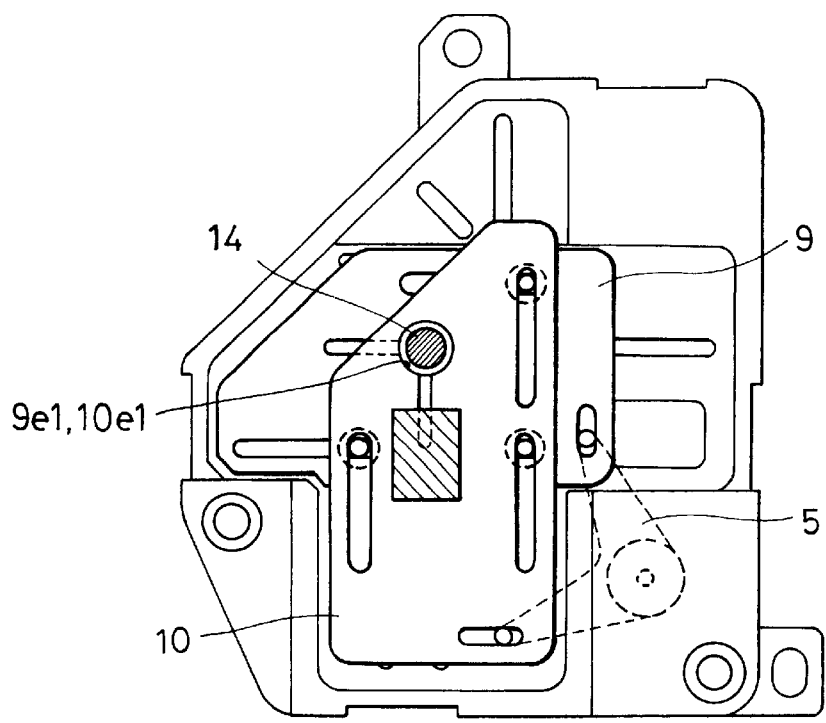
FIG. 3 is a view of the operation of movable blades included in the iris galvanometer shown in FIG. 1.

FIG. 3 shows the full aperture of the diaphragm in which the rotor 5 is moved to a restricted end by a maximum current applied to the windings 4. In this case, the first movable blade 9 and the second movable blade 10 are driven to positions in which the circular openings 9e1 and 10e1 overlap each other on the optical axis, whereby a light-passing opening 14 having the area of the full aperture is formed.

Figure 4:
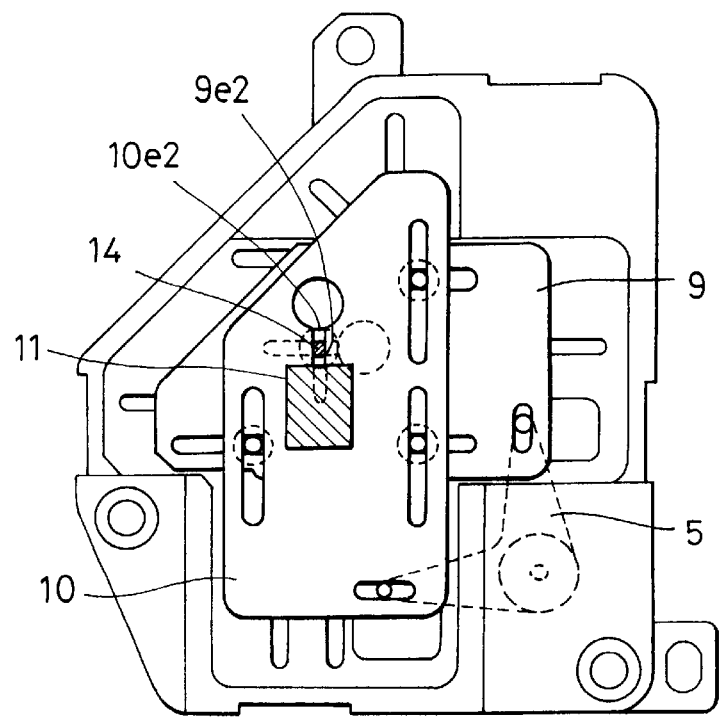
FIG. 4 is a view of the operation of the movable blades included in the iris galvanometer shown in FIG. 1.

As the current applied to the windings 4 is reduced from the state shown in FIG. 3, the rotor 5 rotates in a direction A shown in FIG. 2, whereby the first movable blade 9 moves to the right and the second movable blade 10 moves upward. By this operation, as shown in FIG. 4, the elongated opening 9e2 of the first movable blade 9 and the elongated opening 10e2 of the second movable blade 10 overlap each other on the optical axis at a part of the elongated opening 10e2 of the second movable blade 10, which is not provided with the ND filter. Thus, the overlapping elongated openings 9e2 and 10e2 cause the light-passing opening 14 to be smaller than the full aperture, which corresponds, for example, to F5.6.

Figure 5:
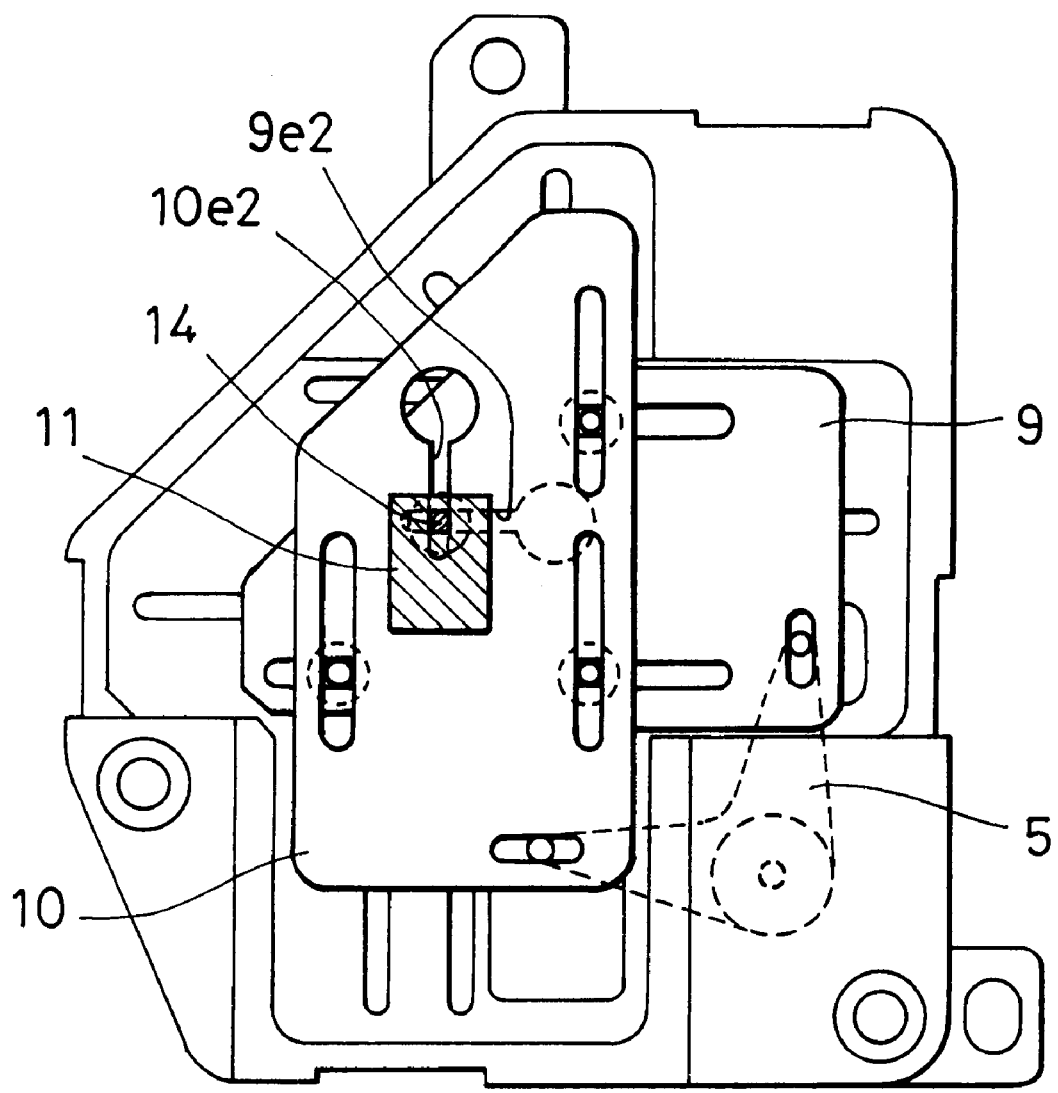
FIG. 5 is a view of the operation of the movable blades included in the iris galvanometer shown in FIG. 1.

When the current applied to the windings 4 is further reduced from the state shown in FIG. 4, the rotor 5 rotates further in the direction A shown in FIG. 2, and the first movable blade 9 moves further to the right and the second movable blade 10 moves further upward. By this operation, as shown in FIG. 5, the elongated opening 9e2 of the first movable blade 9 and the elongated opening 10e2 of the second movable blade 10 overlap each other on the optical axis at a part of the elongated opening 10e2 of the second movable blade 10, which is provided with the ND filer 11. In this case, the quantity of light passing is optically reduced by the ND filter (reduced to, for example, F11) compared with the case shown in FIG. 4, although the area of aperture at the overlapping part in FIG. 5 is the same as that in the case shown in FIG. 4.

Figure 6:
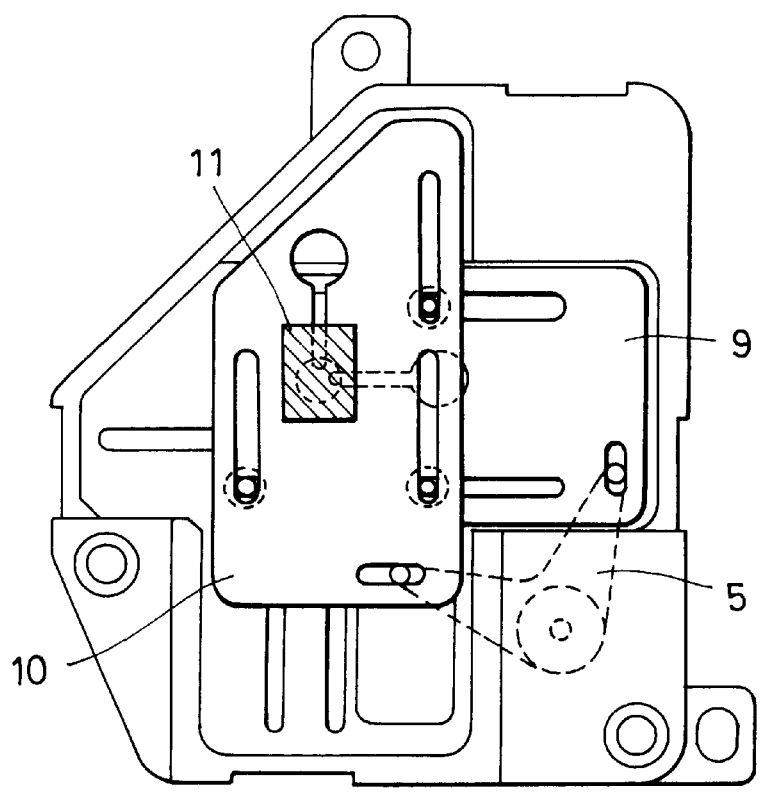
FIG. 6 is a view of the operation of the movable blades included in the iris galvanometer shown in FIG. 1.

In the iris galvanometer shown in FIG. 6, no electric current is applied to the windings 4. The rotor 5 rotates in the direction A shown in FIG. 2 to the other restricted end by a rotational force generated by a cogging effect between the yoke 3 and the permanent magnet 6 fixed to the rotor 5. In this case, the first and second blades 9 and 10 are moved to positions in which the central apertures 9e and 10e do not overlap each other, whereby the diaphragm is completely closed and light does not pass.

In the iris galvanometer according to the present embodiment, the first and second movable blades 9 and 10 are driven in directions perpendicular to each other, whereby the circular openings 9e1 and 10e1 formed in the first and second movable blades 9 and 10, respectively, overlap each other on the optical axis, thereby forming a light-passing opening which is a full aperture. When the elongated openings 9e2 and 10e2 overlap each other on the optical axis, a light-passing opening smaller than the full aperture is formed. The quantity of the light is also controlled optically by moving the first and second movable blades 9 and 10 to positions at which the elongated openings 9e2 and 10e2 overlap each other at a part in which the ND filter is provided. Accordingly, in the iris galvanometer according to the present embodiment, the quantity of light can be set in three steps other than the fully closed state.

With the arrangement set forth above, when forming a light-passing opening smaller than the full aperture, of which the variation in the size significantly affects the quantity of light, the elongated openings 9e2 and 10e2 are overlapped each other on the optical axis, whereby the size of the opening (the area of aperture) at the overlapping part of the elongated openings 9e2 and 10e2 does not vary due to play at mating parts of the protrusions 7 and 8 of the rotor 5 with the holes 9d and 10d of the first and second movable blades 9 and 10, respectively. Accordingly, the size of the light-passing opening, that is a diaphragm stop number, can be stably set.

In the iris galvanometer according to the present embodiment, the diaphragm stop number is set only in steps and cannot be varied continuously. However, at present and particularly in future, progressive-type CCDs will be the mainstream of image-capture devices which can be used in combination with an electronic shutter. In this case, there is no problem in configuring a camera system by using the iris galvanometer according to the present invention.

The iris galvanometer according to the present embodiment is provided with a sensor such as the Hall element 13 in the vicinity of the permanent magnet 6 fixed to the rotor 5, the sensor being used for position detection by detecting the rotational orientation of the rotor 5 with high accuracy by using magnetic leakage fluxes. With this arrangement, the variations in the motion characteristics of the first and second movable blades 9 and 10 and resistance of conductive wires of the windings 4, which are caused by environmental changes, are compensated for, thereby accurately maintaining a desired aperture size.

In the present embodiment, the Hall element 13 is provided in the vicinity of the rotor 5 for detecting the position of the rotor 5 because the iris galvanometer is also used as a mechanical shutter. However, the iris galvanometer may be configured without a sensor such as the Hall element 13, a feedback controlling circuit, and the like because the aperture size can be set in a stable manner, as described above, thereby reducing the manufacturing cost.

According to the present embodiment, apertures are provided in four steps of a full aperture, F5.6, F11, and completely closed. However, the number of aperture steps may be increased by providing an elongated opening of each of the central openings 9e and 10e of the movable blades 9 and 10, respectively, with a width which varies in a plurality of steps.

Second Embodiment

An iris galvanometer according to a second embodiment of the present invention is shown in FIGS. 8A, 8B, 8C, 8D, and 8E. The drawings show a process of setting diaphragm stop numbers of the iris galvanometer according to the embodiment. In this embodiment, the aperture can be set in five steps, including a full aperture (F2.0), F4.0, F8.0, F16, and fully closed.

Figure 8A:
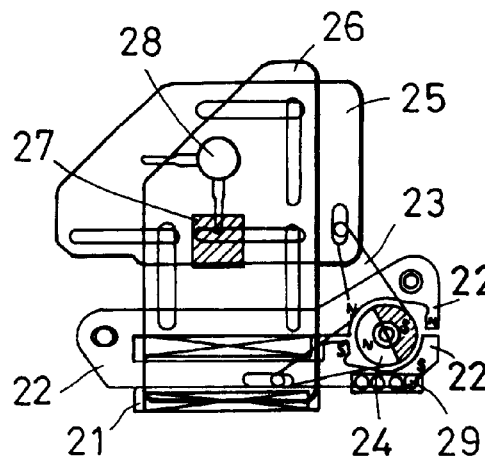
FIGS. 8A, 8B, 8C, 8D, and 8E are views of an iris galvanometer according to a second embodiment of the present invention.
Figure 8B:
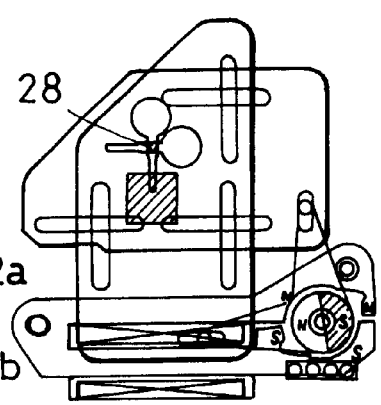
Figure 8C:
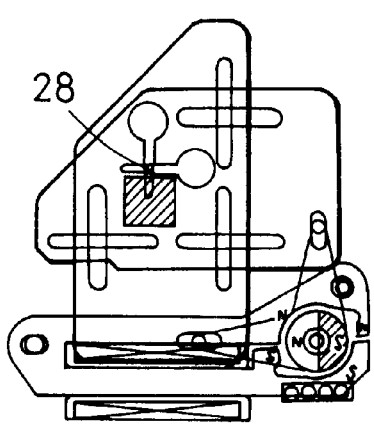
Figure 8D:
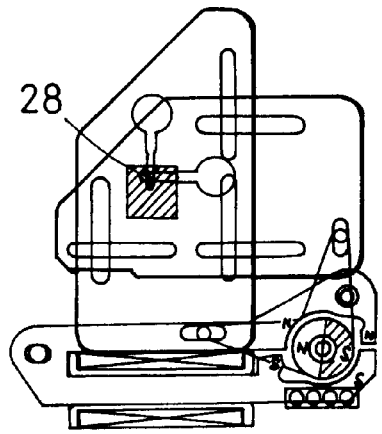
Figure 8E:
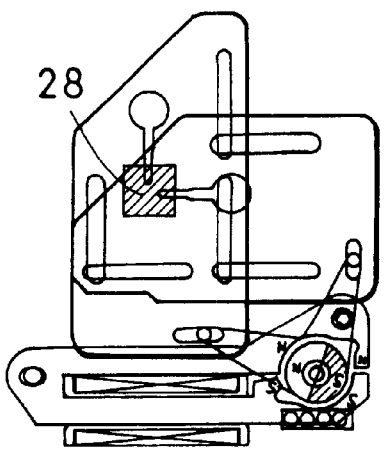

FIG. 8A shows a full aperture state; FIG. 8B shows an aperture state corresponding to the F-number of 4.0; FIG. 8C shows an aperture state corresponding to the F-number of 8.0; FIG. 8D shows an aperture state corresponding to the F-number of 16; and FIG. 8E shows the fully closed state.

The iris galvanometer shown in FIGS. 8A to 8E includes windings 21, a yoke 22, a rotor 23, a permanent magnet 24, a first movable blade 25 to be driven in a horizontal direction, a second movable blade 26 to be driven in a vertical direction, a ND filter 27, and a Hall element 29.

Figure 9:
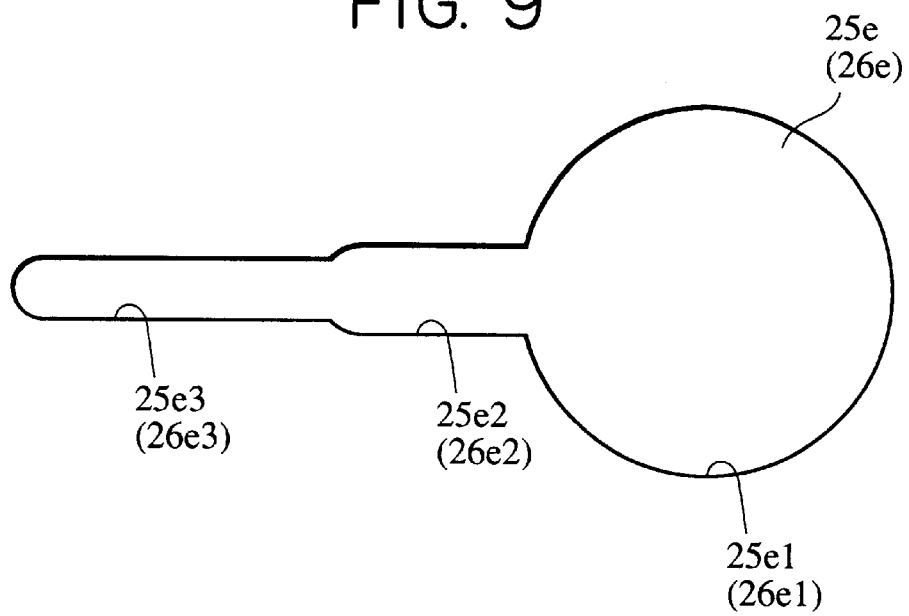
FIG. 9 is an expanded view of an aperture formed in each of movable blades included in the iris galvanometer according to the second embodiment.

The first movable blade 25 is provided with a central opening 25e having a shape shown in FIG. 9. Also as shown in FIG. 9, the central opening 25e includes a circular opening (full aperture part) 25e1 at an end of the central opening 25e, and two elongated openings 25e2 and 25e3 continuously extending from the circular opening 25e1 in the direction of movement (horizontal direction) of the first movable blade 25. The width of the elongated opening 25e3 is smaller than that of the elongated opening 25e2.

The second movable blade 26 is provided with a central opening 26e having a shape also shown in FIG. 9. As shown in FIG. 9, the central opening 26e includes a circular opening (full aperture part) 26e1 at an end of the central opening 26e, and two elongated openings 26e2 and 26e3 continuously extending from the circular opening 26e1 in the direction of movement (vertical direction) of the second movable blade 26. The width of the elongated opening 26e3 is smaller than that of the elongated opening 26e2.

The second movable blade 26 is provided with a ND filter 27 bonded thereto at an end of the elongated opening 26e3, as shown in FIGS. 8A to 8E.

The iris galvanometer thus arranged operates as described below. Due to an electric current applied to the windings 21, a magnetic field is generated and magnetic poles N and S opposing each other are produced at ends 22a and 22b of the yoke 22. The permanent magnet 24 fixed to the rotor 23 is attracted and repelled by the generated magnetic field, thereby rotating the rotor 23.

FIG. 8A shows the full aperture state of the diaphragm in which the rotor 23 is moved to a restricted end by a maximum current applied to the windings 21. In this case, the first movable blade 25 and the second movable blade 26 are driven to positions in which the circular openings 25e1 and 26e1 overlap each other on an optical axis, whereby a light-passing opening 28 having the area of the full aperture is formed.

As the current applied to the windings 21 is reduced from the state shown in FIG. 8A, the rotor 23 rotates, whereby the first movable blade 25 moves to the right and the second movable blade 26 moves upward. By this operation, as shown in FIG. 8B, the elongated opening 25e2 of the first movable blade 25 and the elongated opening 26e2 of the second movable blade 26 overlap each other on the optical axis, whereby the overlapping elongated openings 25e2 and 26e2 cause the light-passing opening 28 to be smaller than the full aperture, which corresponds, for example, to F4.0.

When the current applied to the windings 21 is further reduced from the state shown in FIG. 8B, the rotor 23 further rotates, and the first movable blade 25 moves further to the right and the second movable blade 26 moves further upward. By this operation, as shown in FIG. 8C, the elongated opening 25e3 of the first movable blade 25 and the elongated opening 26e3 of the second movable blade 26 overlap each other on the optical axis at a part of the elongated opening 26e3 of the second movable blade 26, which is not provided with the ND filter 27, thereby causing the light-passing opening 28 to have an area smaller than the opening formed in FIG. 8B. The light-passing opening 28 shown in FIG. 8C corresponds, for example, to the F-number of 8.0.

When the current applied to the windings 21 is further reduced from the state shown in FIG. 8C, the rotor 23 further rotates, and the first movable blade 25 moves further to the right and the second movable blade 26 moves further upward. By this operation, as shown in FIG. 8D, the elongated opening 25e3 of the first movable blade 25 and the elongated opening 26e3 of the second movable blade 26 overlap each other on the optical axis at a part of the elongated opening 26e3 of the second movable blade 26, which is provided with the ND filter 27. In this case, the quantity of light passing is optically reduced by the ND filter 27 (reduced to, for example, F16) compared with the state shown in FIG. 8C, although the area of the aperture at the overlapping part is the same as that in the state shown in FIG. 8C.

FIG. 8E shows a state in which no electric current is applied to the windings 21. The rotor 23 rotates to the other restricted end by a rotational force generated by a cogging effect between the yoke 22 and the permanent magnet 24 fixed to the rotor 23. In this case, the first and second blades 25 and 26 are moved to positions in which the central apertures 25e and 26e do not overlap each other, whereby the diaphragm is completely closed and light does not pass.

According to the second embodiment, the Hall element 29 is provided in the vicinity of the rotor 23 in the same manner as in the first embodiment. However, the iris galvanometer may be configured by eliminating a sensor such as the Hall element, a feedback-control circuit, and the like, thereby reducing the manufacturing cost.

Figure 10:
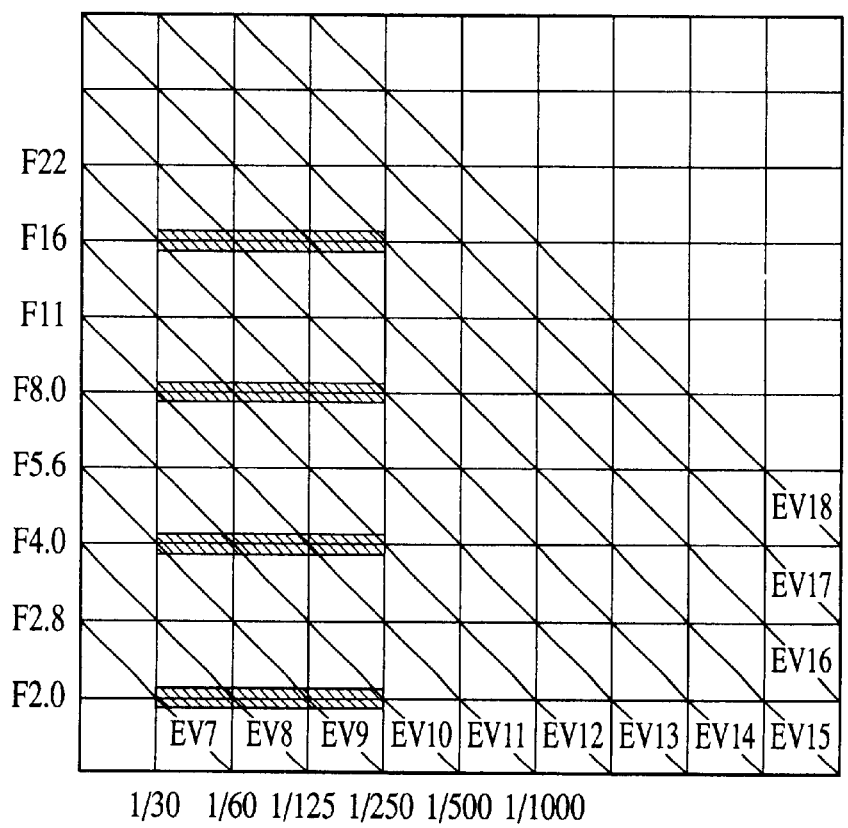
FIG. 10 is a graph showing the relationship between the F-numbers and the shutter speed of a camera using the iris galvanometer according to the second embodiment.

FIG. 10 is a graph showing the relationship between the F-number and the shutter speed of a camera using the iris galvanometer according to the second embodiment. In the iris galvanometer according to the second embodiment, the F-number and the shutter speed are set to values in the range shown by the shaded regions in FIG. 10.

In the iris galvanometer according to the second embodiment, the first and second movable blades 25 and 26 are driven in directions perpendicular to each other, whereby the circular openings 25e1 and 26e1 formed in the first and second movable blades 25 and 26, respectively, overlap each other on the optical axis, thereby forming a light-passing opening which is a full aperture. When the elongated openings 25e2 and 26e2 overlap each other, and when the elongated openings 25e3 and 26e3 overlap each other, on the optical axis, light-passing openings having different sizes smaller than the size of the full aperture are formed. The quantity of the light is also controlled optically by moving the first and second movable blades 25 and 26 to positions at which the elongated openings 25e3 and 26e3 overlap each other at a part in which the ND filter is provided. In the iris galvanometer according to the present embodiment, the quantity of light can be set in five steps including the fully closed state.

Thus, when forming a light-passing opening smaller than the full aperture, of which the variation in the size significantly affects the quantity of light, the elongated openings 25e2 and 26e2 or the elongated openings 25e3 and 26e3 are overlapped with each other on the optical axis, whereby the size of the opening (the area of aperture) at the overlapping part does not vary due to play at mating parts of the rotor 23 with the first and second movable blades 25 and 26. With this arrangement, the size of the light-passing opening, that is the diaphragm stop number, can be stably set.

Third Embodiment

FIGS. 11A, 11B, and 11C show an iris galvanometer (light-quantity controlling device) according to a third embodiment of the present invention. FIG. 11A is a front view of the iris galvanometer, FIG. 11B is a side view of the same, and FIG. 11C is a rear view of the same.

The iris galvanometer shown in FIGS. 11A to 11C includes a first casing 31, a second casing 32, a yoke 33 of a magnetic material and being substantially U-shaped, and conductive windings 34 around the yoke 33 which are connected to an electric circuit (not shown). The iris galvanometer also includes a rotatable rotor 35 (rotation outputting unit) disposed between the ends of the yoke 33 and having a permanent magnet 36. The rotor 35 includes two arms having protrusions 37 and 38 (connecting parts) at the ends of the arms. The two arms having the protrusions 37 and 38 are disposed at an angle of approximately 180 degrees with the rotational center of the rotor 35 therebetween.

The rotor 35 includes a rotating shaft (not shown) extending vertically to couple with bearing units (not shown) of the first and second casings 31 and 32, whereby the rotor 35 is supported rotatably. The permanent magnet 36 having a predetermined orientation is fixed to the rotor 35 at the center thereof.

As shown in FIGS. 11A to 11C, the iris galvanometer includes a first movable blade 39, which moves vertically, having elongated holes 39a, 39b, and 39c serving as guides for restricting the vertical movement of the first movable blade 39. The first movable blade 39 is also provided with a hole 39d in the vicinity of an edge thereof, at which the first movable blade 39 mates with the protrusion 37. With this arrangement, the first movable blade 39 is vertically driven in the casings 31 and 32 by the rotational movement of the rotor 35.

Figure 13:
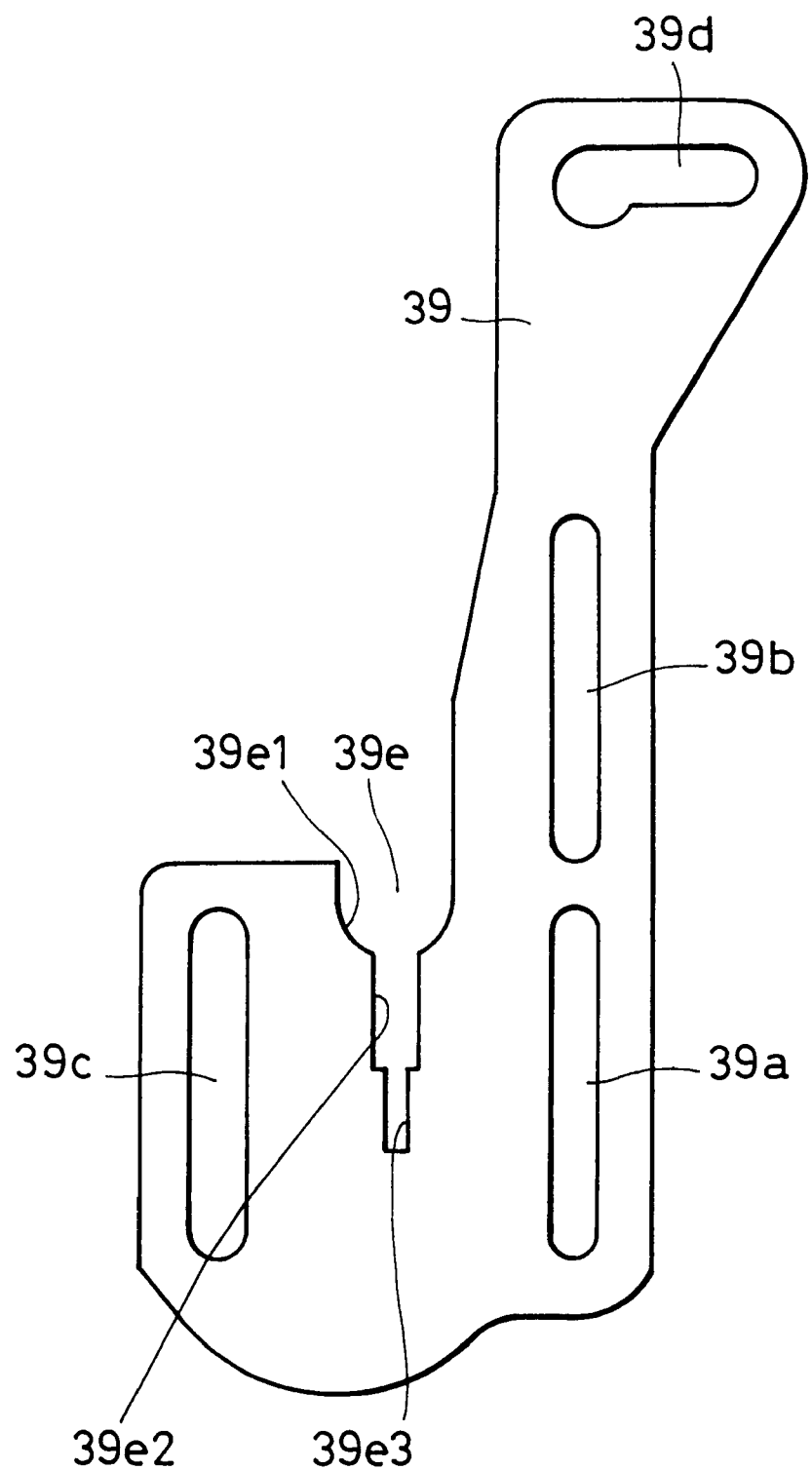
FIG. 13 is an expanded view of a movable blade included in the iris galvanometer according to the third embodiment.

The first movable blade 39 is provided with a central opening 39e substantially at the center thereof. The central opening 39e moves as the first movable blade 39 is driven, and serves as a diaphragm for restricting the quantity of light. As shown in FIG. 13, the central opening 39e includes a semicircular opening 39e1 (full aperture part), and elongated openings 39e2 and 39e3 extending to be connected in series from the semicircular opening 39e1 in the direction of movement (vertical direction) of the first movable blade 39. The width of the elongated opening 39e3 is smaller than that of the elongated opening 39e2.

The iris galvanometer shown in FIGS. 11A to 11C includes a second movable blade 40 which moves vertically along a line parallel to the direction of movement of the first movable blade 39. The second movable blade 40 is provided with elongated holes 40a, 40b, and 40c serving as guides for restricting the vertical movement of the second movable blade 40. The second movable blade 40 is also provided a hole 40d in the vicinity of an edge thereof, at which the second movable blade 40 mates with the protrusion 38. With this arrangement, the second movable blade 40 is driven vertically in the casings 31 and 32 by the rotational movement of the rotor 35.

Figure 14:
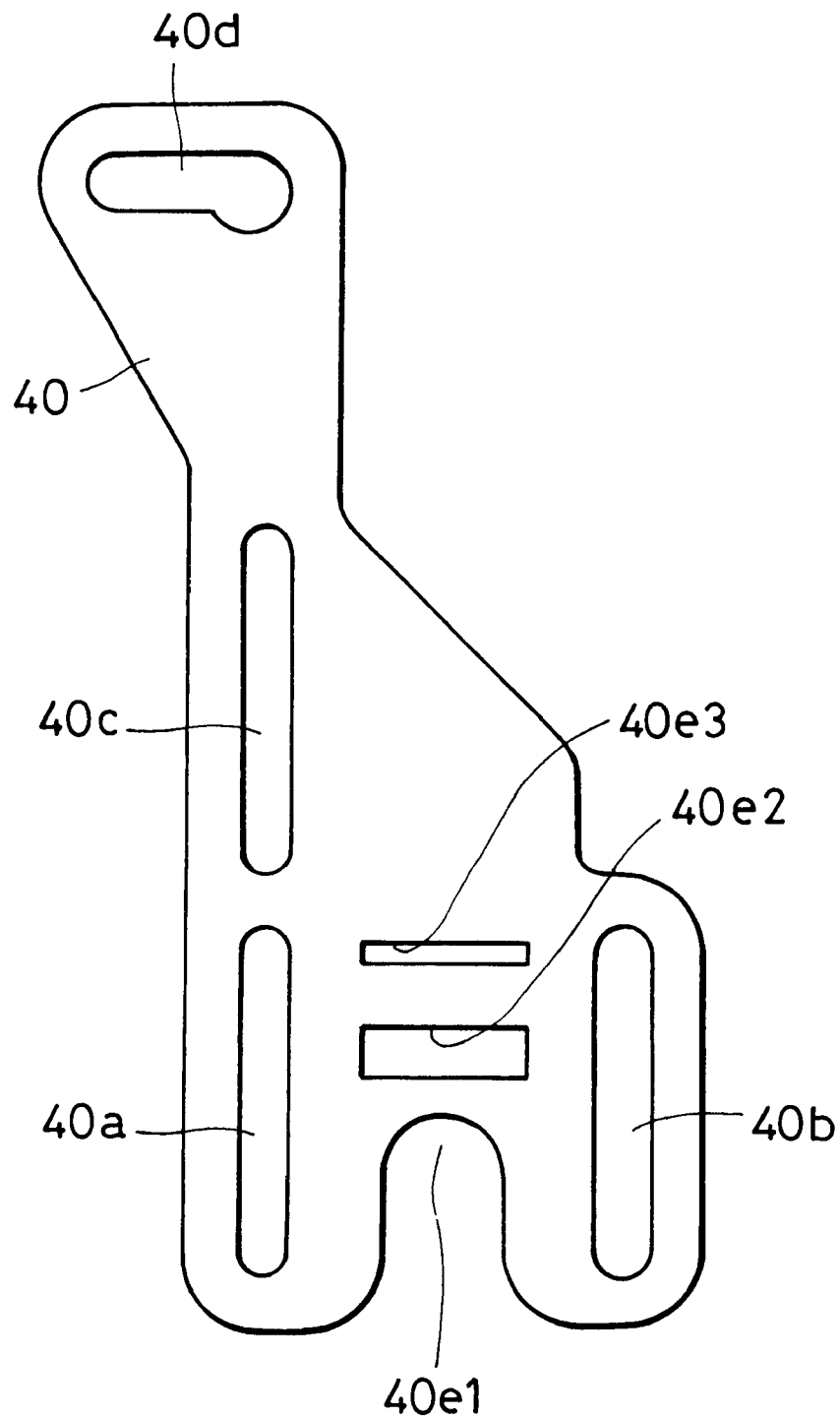
FIG. 14 is an expanded view of another movable blade included in the iris galvanometer according to the third embodiment.

As shown in FIG. 14, the second movable blade 40 is provided with a semicircular opening 40e1 (full aperture part), and elongated openings 40e2 and 40e3 extending in a direction perpendicular to the direction of movement of the second movable blade 40 and disposed to be parallel to each other and to the semicircular opening 40e1 in the direction of movement (vertical direction) of the second movable blade 40. The semicircular opening 40e1 and the elongated openings 40e2 and 40e3, which move as the second movable blade 40 is driven, serve as a diaphragm for restricting the quantity of light. The width of the elongated opening 40e3 is smaller than that of the elongated opening 40e2.

The size and the like of the semicircular opening 40e1 and the elongated openings 40e2 and 40e3 formed in the second movable blade 40 are substantially the same as those of the semicircular opening 39e1 and the elongated openings 39e2 and 39e3 formed in the first movable blade 39.

As shown in FIG. 11C, the iris galvanometer includes a Hall element 41, which is included in a control circuit (not shown) of a device using the iris galvanometer, for detecting a magnetic leakage flux from the permanent magnet 36 fixed to the rotor 35, thereby detecting the rotational orientation of the rotor 35.

The first casing 31 is provided with a supporting plate (not shown) supporting the first and second movable blades 39 and 40.

The first casing 31 is also provided with three protrusions 31a, 31b, and 31c, which mate with the elongated holes 39a, 39b, and 39c, respectively, of the first movable blade 39, and guide the first movable blade 39 to move vertically. The protrusions 31c, 31a, and a protrusion 31d, which mate with the elongated holes 40a, 40b, and 40c, respectively, of the second movable blade 40, guide the second movable blade 40 to move vertically.

The first casing 31 is provided with a circular opening 31e, the size of which is set so as to provide a full diaphragm stop number of the iris galvanometer. The iris galvanometer is mounted in an optical system so that the center of the circular opening 31e is disposed on an optical axis.

The operation of the iris galvanometer arranged as describe above is described as follows with reference to FIGS. 12A, 12B, 12C, and 12D. FIG. 12A shows a full aperture state; FIG. 12B shows a diaphragm stop corresponding to F5.6; FIG. 12C shows a diaphragm stop corresponding to F11; and FIG. 12D shows the fully closed state.

By an electric current applied to the windings 34, a magnetic field is generated, thereby producing magnetic poles N and S opposing each other at the ends 33a and 33b, respectively, of the yoke 33. The permanent magnet 36 fixed to the rotor 35 is attracted and repelled by the generated magnetic field, thereby rotating the rotor 35.

FIG. 12A shows a full aperture state of the iris galvanometer according to the third embodiment, in which the rotor 35 is driven to a restricted end by a maximum current applied to the windings 34. In this case, the first and second movable blades 39 and 40 are driven so that the semicircular openings 39e1 and 40e1 overlap each other on the optical axis to form a circular aperture, thereby forming a light-passing opening 42 having a size of the full aperture.

As the electric current applied to the windings 34 is reduced from the state in FIG. 12A, the rotor 35 rotates in a direction A, thereby driving the first movable blade 39 upward and the second movable blade 40 downward, as shown in FIG. 12B. That is, the first and second movable blades 39 and 40 are vertically driven in directions opposite to each other. As shown in FIG. 12B, the elongated openings 39e2 and 40e2 of the first movable blades 39 and 40, respectively, intersect each other on the optical axis, thereby causing the light-passing opening 42, formed at the intersection, to have an aperture size smaller than that of the full aperture, the aperture size corresponding to the F-number of, for example, 5.6.

When the electric current applied to the windings 34 is further reduced from the state in FIG. 12B, the rotor 35 further rotates so as to drive the first movable blade 39 upward and the second movable blade 40 downward, as shown in FIG. 12C. In this case, the elongated openings 39e3 and 40e3 of the first and second movable blades 39 and 40, respectively, intersect each other on the optical axis, thereby causing the light-passing opening 42, formed at the intersection, to have an aperture size smaller than that of the light-passing opening shown in FIG. 12B, the aperture size corresponding to the F-number of, for example, 11.

In FIG. 12D, no electric current is applied to the windings 34. In this case, the rotor 35 rotates to the other restricted end by a rotational force generated by a cogging effect between the yoke 33 and the permanent magnet 36 fixed to the rotor 35. The first and second movable blades 39 and 40 are driven to positions in which the openings in the first and second movable blades 39 and 40 do not overlap each other. In this case, the diaphragm is in a fully closed state and blocks the light.

Figure 17:
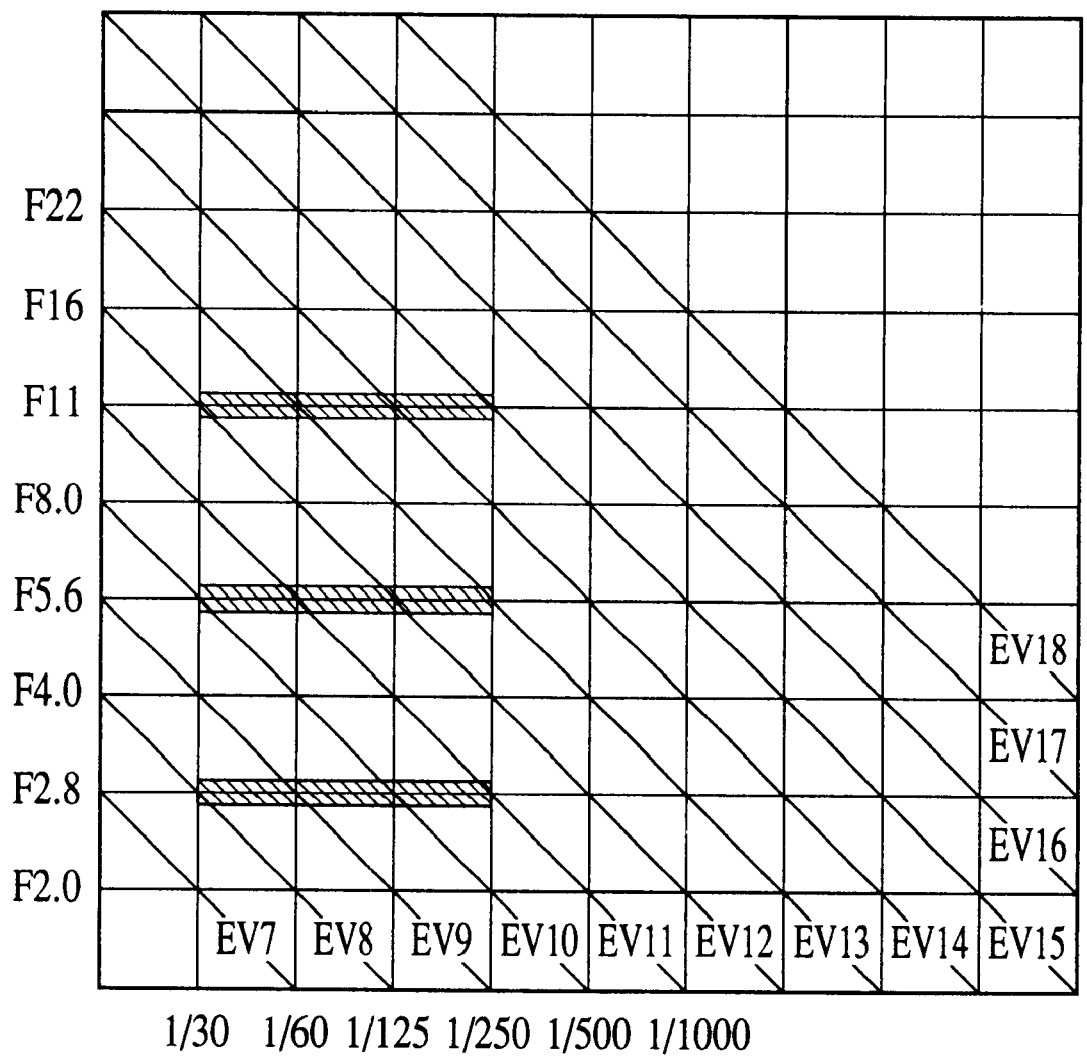
FIG. 17 is a graph showing the relationship between the F-numbers and the shutter speed of a camera using the iris galvanometer according to the third embodiment.

FIG. 17 is a graph showing the relationship between the F-number and the shutter speed of a camera using the iris galvanometer according to the present embodiment. The F-number and the shutter speed are set in ranges shown by the shaded regions in FIG. 17.

In the iris galvanometer according to the present embodiment, the first and second movable blades 39 and 40 are driven in directions opposite to each other. The semicircular openings 39e1 and 40e1 of the first and second movable blades 39 and 40, respectively, overlapping each other on the optical axis, form a circular light-passing opening having a size of the full aperture. The elongated openings 39e2 and 40e2 or the elongated openings 39e3 and 40e3 of the first and second movable blades 39 and 40, respectively, intersecting each other on the optical axis, form a light-passing opening having a size smaller than that of the full aperture. Thus, in the iris galvanometer according to the present embodiment, the quantity of light can be set in three steps, other than the fully closed position.

Accordingly, when forming a light-passing opening smaller than the full aperture, of which the variation in the size significantly affects the quantity of light, the elongated openings 39e2 and 40e2 or the elongated openings 39e3 and 40e3 are overlapped with each other on the optical axis. Thus arranged, the size of the opening (the area of aperture) at the overlapping part of the elongated openings 39e2 and 40e2 or the elongated openings 39e3 and 40e3 does not vary due to play at mating parts of the protrusions 37 and 38 of the rotor 35 with the holes 39d and 40d of the first and second movable blades 39 and 40, respectively, or due to variation in the rotational orientation of the rotor 35 caused by environmental changes. With this arrangement, the size of the light-passing opening, that is the diaphragm stop number, can be stably set.

In the iris galvanometer according to this embodiment, the diaphragm stop number is set in steps and not varied continuously. However, at present and particularly in future, progressive-type CCDs will be the mainstream of image-capture devices which can be used in combination with an electronic shutter. There is no problem in configuring such a camera system by using the iris galvanometer according to the invention.

The iris galvanometer according to the present embodiment is provided with a sensor such as the Hall element 41 in the vicinity of the permanent magnet 36 fixed to the rotor 35, the sensor being used for position detection by detecting the rotational orientation of the rotor 35 with high accuracy by using magnetic leakage fluxes. With this arrangement, the variations in the motion characteristics of the first and second movable blades 39 and 40 and resistance of conductive wires of the windings 34 due to environmental changes are compensated for, thereby accurately maintaining a desired aperture size.

According to the present embodiment, the Hall element 41 is provided in the vicinity of the rotor 35 for detecting the position of the rotor 35 because the iris galvanometer is also used as a mechanical shutter. However, the iris galvanometer may be configured by eliminating a sensor such as the Hall element 41, a feedback-control circuit, and the like because the aperture size can be stably set, as described above, thereby reducing the manufacturing cost.

In addition, in the iris galvanometer according to the present embodiment, the amount of movement of the first and second movable blades 39 and 40 from the full aperture state to the smallest aperture state (F11) can be reduced in comparison with a known iris galvanometer. This is described below with reference to FIG. 15.

Figure 15:
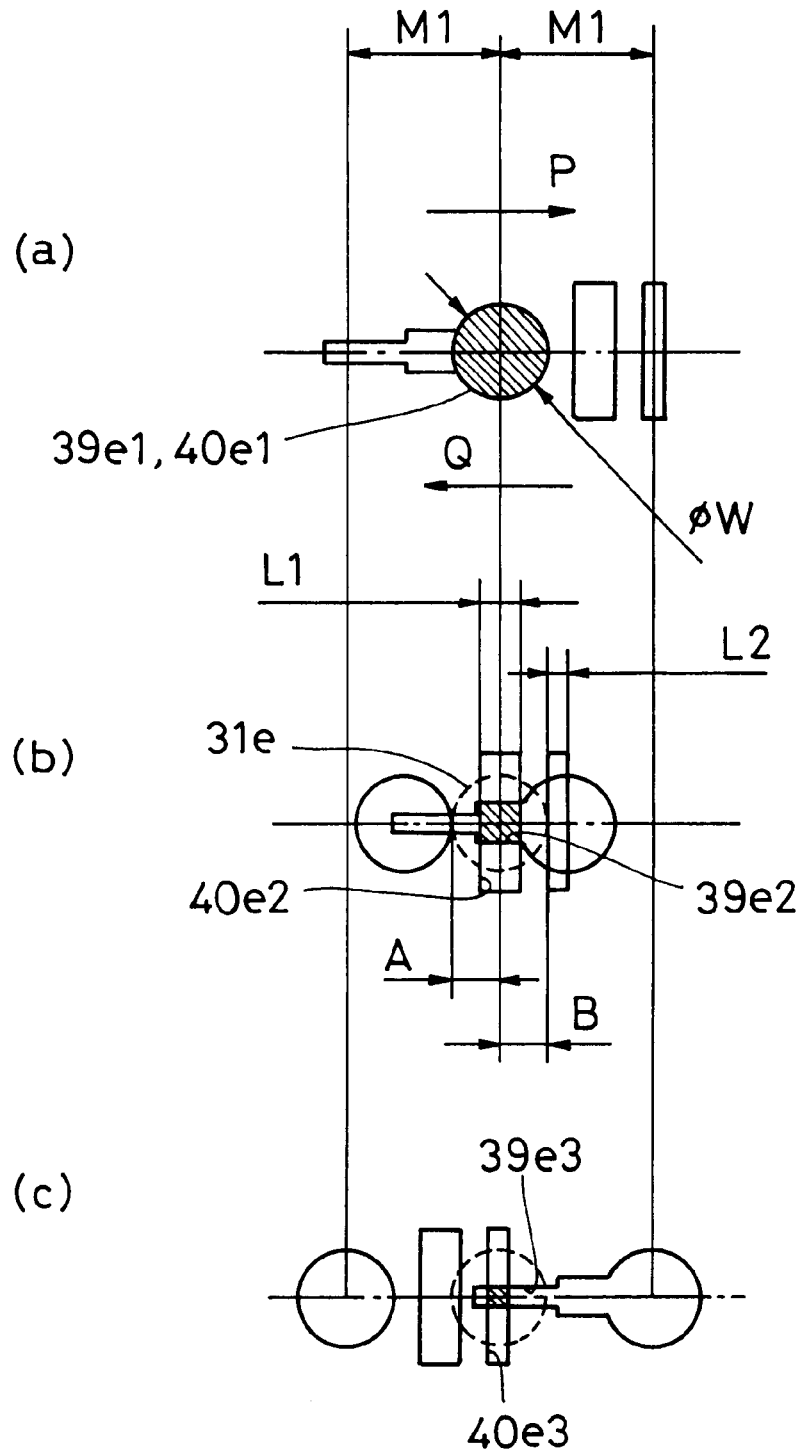
FIG. 15 is a diagram showing the operation of the movable blades included in the iris galvanometer according to the third embodiment.

FIG. 15 is a schematic diagram of the first movable blade 39 and the second movable blade 40 forming apertures in three steps (a), (b), and (c). FIG. 15 shows the step (a) in a full aperture state, the step (b) of the aperture having the F-number of 5.6, and the step (c) of the aperture having the F-number of 11. The circular opening 31e formed in the first casing 31 is shown by dotted circules in the steps (b) and (c). The light-passing opening formed on the optical axis is shown by the shaded portion in the steps (a), (b), and (c).

In FIG. 15, the first movable blade 39 moves in a direction P and the second movable blade 40 moves in a direction Q when closing the aperture. In this case, for simplifying the description, the diameter W of the circular opening 31e is set to 2 mm, and the positioning error, the variation in the movement of the first and second movable blades 39 and 40, etc., are not considered. The diameter W of the circular opening 31e is set to be the same as the diameter of an opening to be formed by the semicircular openings 39e1 and 40e1 overlapping each other. In FIG. 15, the semicircular openings 39e1 and 40e1 are conveniently shown as circular openings.

The distance between the center of the elongated opening 40e2 of the second movable blade 40, which corresponds to the F-number of 5.6, and an edge adjacent thereto of the semicircular opening 40e1 of the second movable blade 40 is determined so that the semicircular opening 40e1 is disposed sufficiently away from the circular opening 31e so as not to allow light to pass through the semicircular opening 40e1 and the circular opening 31e when the center of the elongated opening 40e2 is disposed on the optical axis in the step (b) shown in FIG. 15. The distance is set to A as shown in FIG. 15.

The distance between the center of the elongated opening 40e2 and the elongated opening 40e3 of the second movable blade 40, which corresponds to the F-number of 11, is determined so that the elongated opening 40e3 is disposed sufficiently away from the circular opening 31e of the first casing 31 so as not to allow light to pass through the elongated opening 40e3 and the circular opening 31e when the center of the elongated opening 40e2 is disposed on the optical axis in the step (b) shown in FIG. 15. Specifically, the distance is set to B shown in FIG. 15.

When the diameter W of the circular opening 31e of the first casing 31 is set to 2 mm, the above-described values are determined as follows. A width L1 of the elongated opening 40e2 of the second movable blade 40 is 0.87 mm. A width L2 of the elongated opening 40e3, which corresponds to the minimum diaphragm stop number, is 0.44 mm. The driven amount M1 of each of the first and second movable blades 39 and 40 from the full aperture state to the smallest aperture state (F11) is expressed below.

$$M1=(\tfrac{1}{2})\times W+A+B+(\tfrac{1}{2})\times L2 =3.22 \text{ (mm)} \quad W=A+B$$

As found in the above-described expression, the driven amount M1 and the diameter W of the full aperture are determined by the width L2 corresponding to a minimum diaphragm stop number.

Figure 16:
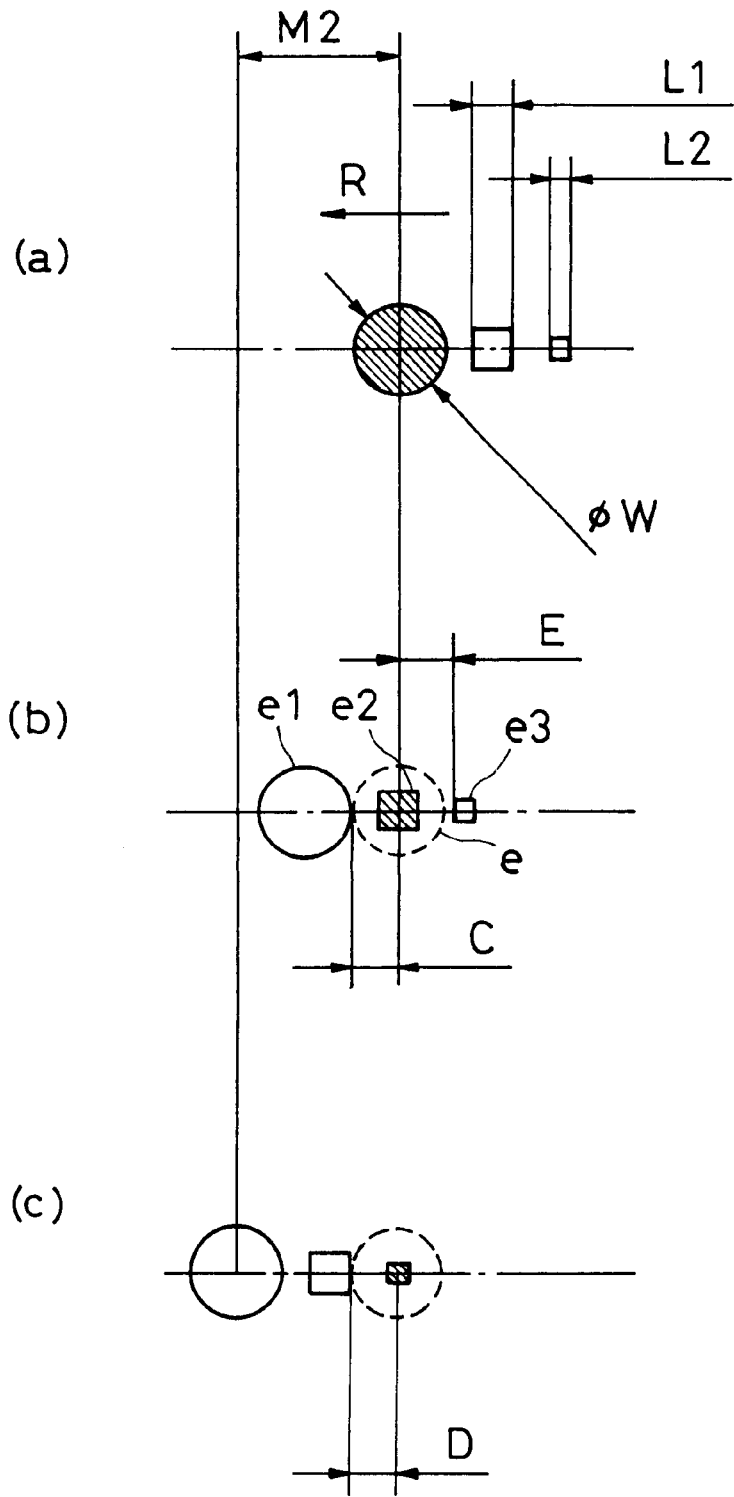
FIG. 16 is a diagram showing the operation of a movable blade included in a known diaphragm mechanism.

FIG. 16 is a schematic diagram of the light-passing opening formed by a diaphragm mechanism of a known diaphragm device for changing the size of the aperture in steps (a turret-type diaphragm). The turret-type diaphragm generally includes one movable blade having a plurality of openings having different sizes for changing the aperture.

In FIG. 16, the light-passing opening corresponding to each aperture is shown by solid lines and a circular opening e provided in a casing is shown by dotted lines. The light-passing opening on the optical axis is shown by the shaded regions.

FIG. 16 shows a step (a) in a full aperture state of F2.8, a step (b) of the F-number of 5.6, and a step (c) of the F-number of 11.

The movable blade moves in a direction R when closing the aperture. In this case, for simplifying the description, the diameter W of the circular opening e is set to 2 mm, the positioning error, the variation in the movement of the movable blade, etc., are not considered. The diameter of the circular opening e is set to be the same as the diameter of a full aperture e1.

The distance between the center of a rectangular opening e2, which corresponds to the F-number of 5.6, and the adjacent part of the circumference of the full aperture e1 is determined so that the full aperture e1 is disposed sufficiently away from the circular opening e so as not to allow light to pass through the full aperture e1 and the circular opening e when the center of the rectangular opening e2 is disposed on the optical axis in the step (b) shown in FIG. 16. Specifically, the distance between the center of the rectangular opening e2 and the adjacent part of the circumference of the full aperture e1 is set to C shown in FIG. 16.

The distance between the rectangular opening e2 corresponding to the F-number of 5.6 and a rectangular opening e3 corresponding to the F-number of 11 is determined so that the rectangular opening e2 is disposed sufficiently away from the circular opening e so as not to allow light to pass through the rectangular opening e2 and the circular opening e when the center of the rectangular opening e3 is disposed on the optical axis in the step (c) shown in FIG. 16. For example, the distance between the rectangular opening e2 corresponding to the F-number of 5.6 and the rectangular opening e3 corresponding to the F-number of 11 is set to D shown in FIG. 16.

When the diameter W of the circular opening e is set to 2 mm, a width L1 of the rectangular opening e2 (an intermediate aperture) is 0.87 mm, and a width L2 of the rectangular opening e3 is 0.44 mm. A driven amount M2 of the movable blade from the full aperture state to the fully closed state (F11) is expressed by:

$$M2=(½) \times W+C+D+(½)\times L1=3.44 \text{ mm } W=C+D$$

As found from the above-described expression, the driven amount M2 is determined by the diameter W of the full aperture and the width L1 corresponding to the intermediate aperture.

According to the present embodiment described above, the driven amount M1 of the first and second movable blades 39 and 40 from a full aperture state to a smallest aperture state is determined in accordance with the width L2 corresponding to the smallest aperture, thereby reducing the driven amount M1 of the first and second movable blades 39 and 40 from the full-aperture state to the smallest-aperture state. Accordingly, the shutter speed can be increased when the iris galvanometer according to the present embodiment is used as a mechanical shutter, and the iris galvanometer can be reduced in size.

In the iris galvanometer according to the present embodiment, four steps of the aperture, namely, the full aperture, F5.6, F11, and fully closed are provided. The number of aperture steps can be increased by increasing the number of elongated openings to be formed in the first and second movable blades 39 and 40.

According to the first, second, and third embodiments of the present invention, circular or semicircular openings are formed in the first and second movable blades which form a light-passing opening having the same area as the size of a full aperture. The openings to form the light-passing opening may be formed of elongated openings which extend perpendicular to each other, and form the light-passing opening at an overlapping part thereof. With this arrangement, a full aperture size can be stably set even when there is play between the rotor and the first and second movable blades, and when the rotational orientation of the rotor varies due to environmental changes or the like.

Fourth Embodiment

Figure 18:
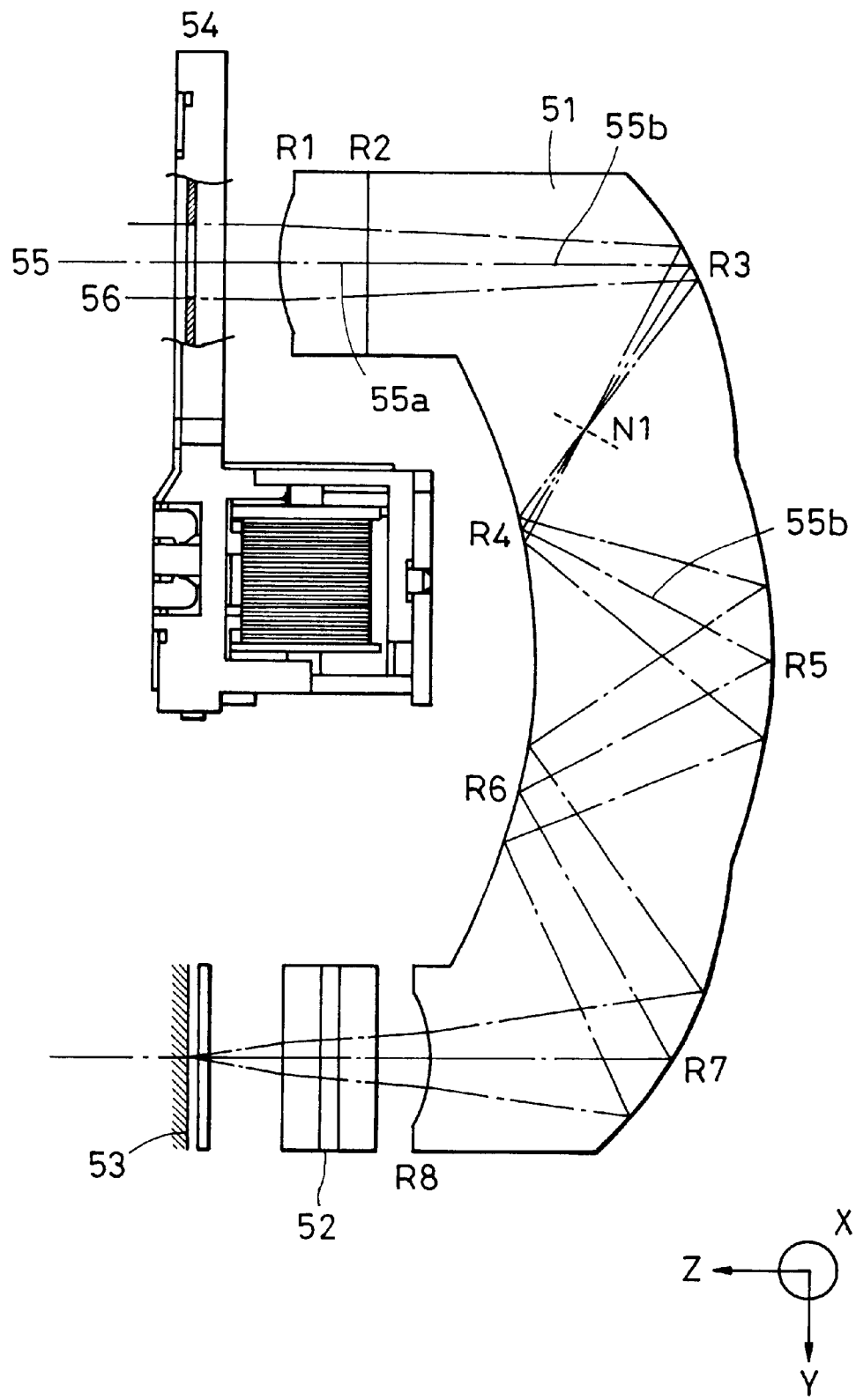
FIG. 18 is a block diagram of an optical apparatus using the iris galvanometer according to the first, second, and third embodiments.
Figure 19:
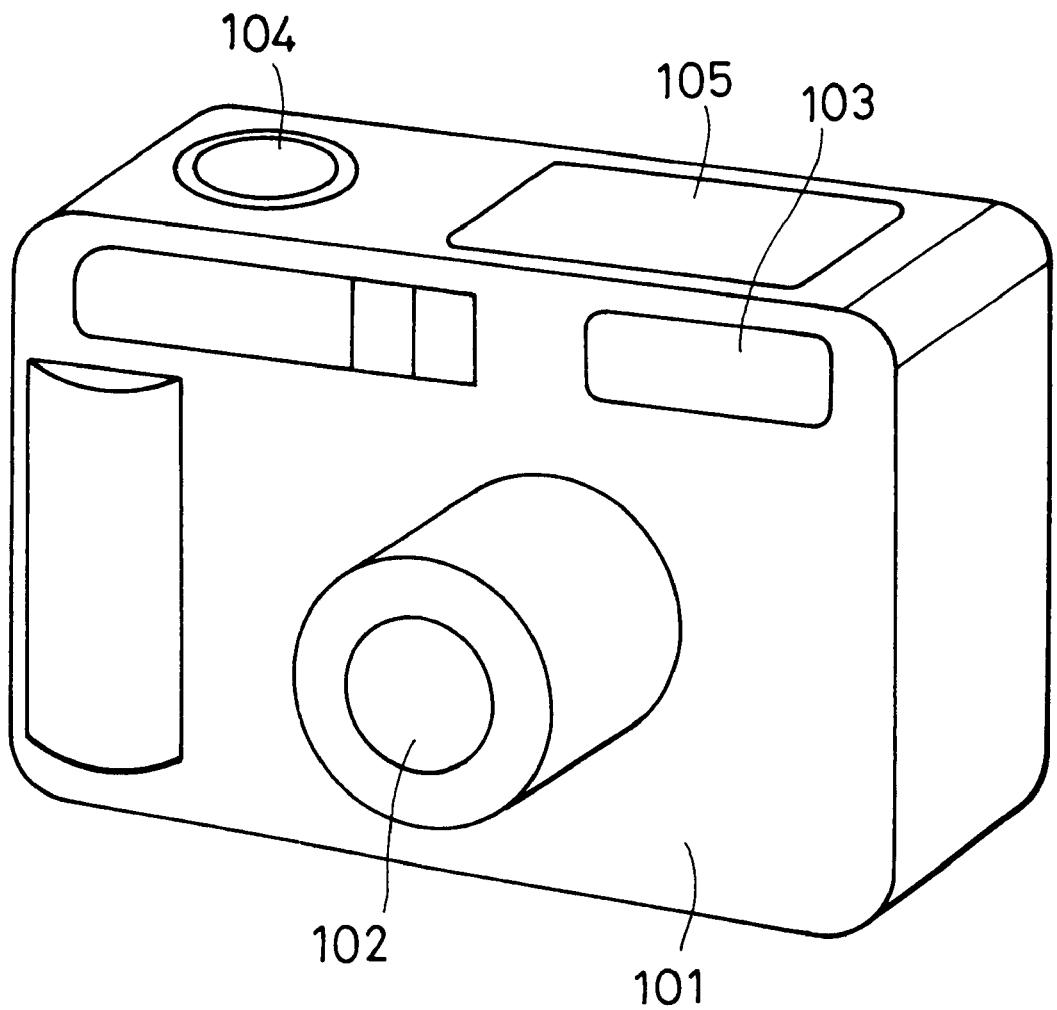
FIG. 19 is a perspective view of a known camera.
Figure 20C:
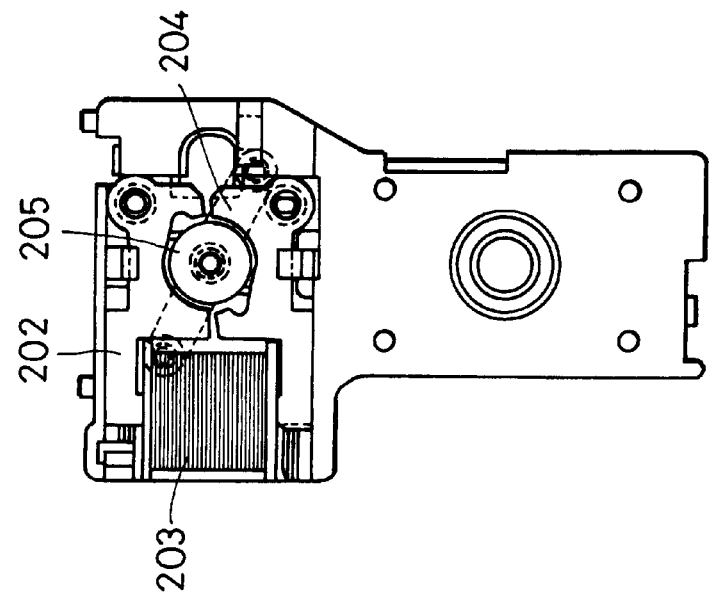
FIGS. 20A, 20B, and 20C are a front view, a side view, and a rear view, respectively, of a known iris galvanometer.
Figure 20B:
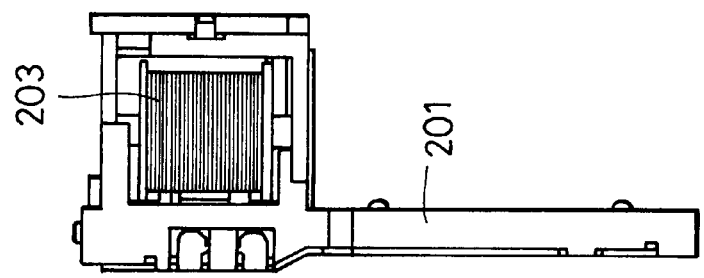
Figure 20A:
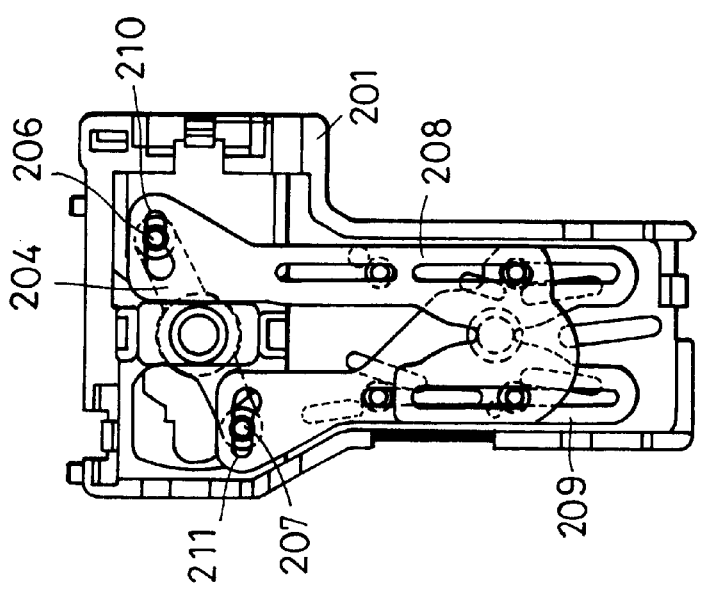

FIG. 18 shows a longitudinal section of light paths in an optical element used in an optical apparatus using the iris galvanometer according to the first, second, and third embodiments. The optical device shown in FIG. 18 is used in an optical apparatus, such as a video camera, a still video camera, or a copying machine.

In FIG. 18, an optical element 51, including a plurality of curved reflective surfaces integrated with the optical element 51, includes, in order from an object, a convex lens R1, a planar mirror R2, a concave mirror R3, a convex mirror R4, a concave mirror R5, a convex mirror R6, a concave mirror R7, and a concave lens R8. The reflective surfaces are shown by curved lines in FIG. 18. The planar mirror R2 is positioned so as to deflect a reference optical axis 55a by an angle of 90 degrees, as described below. In FIG. 18, which shows the light paths in a longitudinal section, the reference optical axis 55a of the planar mirror R2 is disposed on the same plane as a plane along a reference optical axis 55b between the planar mirror R2 and the concave lens R8. The reference optical axis 55a between the convex lens R1 and the planar mirror R2 is disposed at an angle of 90 degrees (perpendicular) to the reference optical axis 55b, the angle being determined by the inclined position of the planar mirror R2.

The optical element 51 includes a corrector plate 52 having crystal low-pass filters, and an infrared blocking filter sandwiched by the crystal low-pass filters. The corrector plate 52 produces double refraction in the horizontal and vertical directions with the crystal low-pass filters included therein. FIG. 18 shows the surface 53 of an image-capture element such as a CCD.

In FIG. 18, an iris galvanometer 54 according to the first, second, and third embodiments is disposed at the object side of the optical element 51. The reference optical axes 55a and 55b of a photographic optical system of the optical element 51 are generally represented by numeral 55.

The reference optical axis 55a through the convex lens R1 to the planar mirror R2 is perpendicular to the reference optical axis 55b from the planar mirror R2 to the concave lens R8.

An image-forming operation of the optical element 51 is described as follows. The quantity of incoming rays 56 from an object is controlled by the iris galvanometer 54, and the controlled rays 56 are applied to the convex lens R1. The rays 56 passing the convex lens R1 are applied to the planar mirror R2, reflected thereby by an angle of 90 degrees, and applied to the concave mirror R3.

The rays 56 reflected by the concave mirror R3 form a preliminary image on an intermediate image-forming plane N1 by using the power of the convex lens R1. The preliminary image is formed in an intermediate part of the optical element 51, so that the effective aperture of light fluxes on planes disposed toward the image-capture element 53 from the iris galvanometer 54 is not enlarged.

The rays 56 forming the preliminary image on the intermediate image-forming plane N1 are reflected and refracted by the convex mirror R4, the concave mirror R5, convex mirror R6, the concave mirror R7, and the concave lens R8 due to the power of each of the mirrors and the lens, and form an image of the object on the image-capture element 53.

The optical element 51 functions as a lens unit having desired optical characteristics and a positive power, in which the incoming rays are refracted at the incidence side and output side, and reflected by each of a plurality of the reflectors having curvatures.

The iris galvanometer 54 according to the present invention is suitable for use in combination with an integrated type optical element such as the optical element 51, including freely curved surfaces, namely, a rotation-asymmetric aspherical optical system, the iris galvanometer 54 being disposed at the incidence side. The iris galvanometer 54 is most suitable for a diaphragm mechanism of such an optical element using the freely curved surfaces and a diaphragm mechanism having a diaphragm aperture reduced due to the reduction in size of image-capture elements.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A light-quantity controlling device comprising:
   a driving source;
   a first light-quantity controlling member driven by said driving source, and having a first elongated opening extending in a direction of movement of said first light-quantity controlling member;
   a second light-quantity controlling member driven by said driving source in a direction substantially perpendicular to the direction of movement of said first light-quantity controlling member, and having a second elongated opening extending in the direction of movement of said second light-quantity controlling member; and
   a supporting member configured to support said first and second light-quantity controlling members, said supporting member having an opening therein,
      wherein said first and second elongated openings intersect each other at the opening provided in said supporting member when said first and second light-quantity controlling members are driven by said driving source.

2. A light-quantity controlling device according to claim 1, wherein the width of the first elongated opening of said first light-quantity controlling member and the width of the second elongated opening of said second light-quantity controlling member are substantially the same.

3. A light-quantity controlling device according to claim 1, wherein the length of the first elongated opening of said first light-quantity controlling member and the length of the second elongated opening of said second light-quantity controlling member are substantially the same.

4. A light-quantity controlling device according to claim 1, further comprising at least one neutral density filter bonded to one of said first light-quantity controlling member and said second light-quantity controlling member at an end of one of the first elongated opening and the second elongated opening thereof, respectively.

5. A light-quantity controlling device according to claim 1, wherein each of said first and second light-quantity controlling members is provided with a circular opening at an end of each of the first and second elongated openings, respectively, the circular opening being larger than the opening of said supporting member.

6. A light-quantity controlling device according to claim 5, further comprising at least one neutral density filter bonded to one of said first light-quantity controlling member and said second light-quantity controlling member at an end opposite the circular opening of a corresponding one of the first elongated opening and the second elongated opening thereof.

7. A light-quantity controlling device according to claim 1, wherein each of the first and second elongated openings has different widths along the length thereof.

8. A light-quantity controlling device according to claim 1, wherein each of the first and second elongated openings has a width that varies along a plurality of steps.

9. A light-quantity controlling device according to claim 7, further comprising at least one neutral density filter bonded to one of said first light-quantity controlling member and said second light-quantity controlling member at a portion of one of the first and second elongated openings including a smallest width of the elongated openings.

10. A light-quantity controlling device according to claim 7, wherein a circular opening is formed in each of said first and second light-quantity controlling members at a part of each of said first and second elongated openings, respectively, including the largest width thereof, the circular opening being larger than the opening of the supporting member.

11. A light-quantity controlling device comprising:
    a driving source;
    a first light-quantity controlling member driven by said driving source, and having a first elongated opening extending in a direction of movement of said first light-quantity controlling member;
    a second light-quantity controlling member driven by said driving source in a direction opposite to the direction of movement of said first light-quantity controlling member, and having a second elongated opening extending in a direction substantially perpendicular to the direction in which the first elongated opening of said first light-quantity controlling member extends; and
    a supporting member configured to support said first and second light-quantity controlling members, said supporting member having an opening therein,
       wherein the first and second elongated openings intersect each other at the opening provided in said supporting member when said first and second light-quantity controlling members are driven by said driving source.

12. A light-quantity controlling device according to claim 11, wherein the width of the first elongated opening of said first light-quantity controlling member and the width of the second elongated opening of said second light-quantity controlling member, which intersect each other at the opening of said supporting member, are substantially the same.

13. A light-quantity controlling device according to claim 11, wherein said first light-quantity controlling member further comprises at least one additional elongated opening, with the elongated openings of said first light-quantity controlling member having different widths, and said second light-quantity controlling member further comprises at least one additional elongated opening, with the elongated openings of said second light-quantity controlling member having different widths, and the elongated openings of said first light-quantity controlling member being disposed in series and the elongated openings of said second light-quantity controlling member being disposed parallel to each other.

14. A light-quantity controlling device according to claim 13, wherein a semicircular opening is provided in said first light-quantity controlling member at an end of the openings, the semicircular opening forming a portion of a circular aperture larger than the opening of said supporting member.

15. A light-quantity controlling device according to claim 13, wherein a semicircular opening is disposed in said second light-quantity controlling member, parallel to the elongated openings thereof having different widths, the semicircular opening forming a portion of a circular aperture larger than the opening of the supporting member.

16. An image pickup apparatus including a light-quantity controlling device comprising:
   a driving source;
   a first light-quantity controlling member driven by said driving source and having a first elongated opening extending in a direction of movement of said first light-quantity controlling member;
   a second light-quantity controlling member driven by said driving source in a direction substantially perpendicular to the direction of movement of said first light-quantity controlling member, and having a second elongated opening extending in the direction of movement of said second light-quantity controlling member; and
   a supporting member configured to support said first and second light-quantity controlling members, said supporting member having an opening therein,
      wherein the first and second elongated openings intersect each other at the opening provided in said supporting member when said first and second light-quantity controlling members are driven by said driving source.

17. An apparatus including a light-quantity controlling device according to claim 16, wherein the width of the first elongated opening of said first light-quantity controlling member and the width of the second elongated opening of said second light-quantity controlling member are substantially the same.

18. An apparatus including a light-quantity controlling device according to claim 16, wherein the length of the first elongated opening of said first light-quantity controlling member and the length of the second elongated opening of said second light-quantity controlling member are substantially the same.

19. An apparatus including a light-quantity controlling device according to claim 16, further comprising at least one neutral density filter bonded to one of said first light-quantity controlling member and said second light-quantity controlling member at an end of one of the first elongated opening and the second elongated opening thereof, respectively.

20. An apparatus including a light-quantity controlling device according to claim 16, wherein each of the first and second light-quantity controlling members is provided with a circular opening at an end of each of the first and second elongated openings, respectively, the circular opening being larger than the opening of said supporting member.

21. An apparatus including a light-quantity controlling device according to claim 20, further comprising at least one neutral density filter bonded to one of said first light-quantity controlling member and said second light-quantity controlling member at an end opposite the circular opening of a corresponding one of the first elongated opening and the second elongated opening thereof.

22. An apparatus including a light-quantity controlling device according to claim 16, wherein each of the first and second elongated openings has different widths along the length thereof.

23. An apparatus including a light-quantity controlling device according to claim 16, wherein each of the first and second elongated openings has a width that varies along a plurality of steps.

24. An apparatus including a light-quantity controlling device according to claim 22, further comprising at least one neutral density filter bonded to one of said first light-quantity controlling member and said second light-quantity controlling member at a portion of one of the first and second elongated openings including a smallest width of the elongated openings.

25. An apparatus including a light-quantity controlling device according to claim 22, wherein a circular opening is formed in each of said first and second light-quantity controlling members at a part of each of the first and second elongated openings, respectively, including the largest width thereof, said circular openings being larger than the opening of said supporting member.

26. An image pickup apparatus including a light-quantity controlling device comprising:
   a driving source;
   a first light-quantity controlling member driven by said driving source and having a first elongated opening extending in a direction of movement of said first light-quantity controlling member;
   a second light-quantity controlling member driven by said driving source in a direction opposite to the direction of movement of said first light-quantity controlling member and having a second elongated opening extending in a direction substantially perpendicular to the direction in which the first elongated opening of said first light-quantity controlling member extends; and
   a supporting member configured to support said first and second light-quantity controlling members, said supporting member having an opening therein,
      wherein the first and second elongated openings intersect each other at the opening provided in said supporting member when said first and second light-quantity controlling members are driven by said driving source.

27. An apparatus including a light-quantity controlling device according to claim 26, wherein the width of the first elongated opening of said first light-quantity controlling member and the width of the second elongated opening of said second light-quantity controlling member, which intersect each other on the opening of said supporting member, are substantially the same.

28. An apparatus including a light-quantity controlling device according to claim 26, wherein said first light-quantity controlling member further comprises at least one additional elongated opening, with the elongated openings thereof having different widths, and said second light-quantity controlling member further comprises at least one additional elongated opening, with the elongated openings thereof having different widths, and the elongated openings of said first light-quantity controlling member is disposed in series and the elongated openings of said second light-quantity controlling member being disposed parallel to each other.

29. An apparatus including a light-quantity controlling device according to claim 28, wherein a semicircular opening is provided in said first light-quantity controlling member at an end of the elongated openings, the semicircular opening forming apportion of a circular aperture larger than the opening of said supporting member.

30. An apparatus including a light-quantity controlling device according to claim 28, wherein a semicircular opening is disposed in said second light-quantity controlling member, parallel to the elongated openings having different widths, the semicircular opening forming a portion of a circular aperture larger than the opening of said supporting member.

31. An apparatus including a light-quantity controlling device according to claim 16, further comprising an optical element including a plurality of curved reflective surfaces integrated with said optical element.

32. An apparatus including a light-quantity controlling device according to claim 26, further comprising an optical element including a plurality of curved reflective surfaces integrated with said optical element.

* * * * *

UNITED STATES PATENT AND TRADEMARK OFFICE
CERTIFICATE OF CORRECTION

PATENT NO. : 6,340,252 B1
DATED : January 22, 2002
INVENTOR(S) : Kenji Kawano

It is certified that error appears in the above-identified patent and that said Letters Patent is hereby corrected as shown below:

Column 7,
Line 30, "filer" should read -- filter --;
Line 32, "filter" should read -- filter 11 --; and
Line 66, "each" should read -- with each --.

Column 8,
Line 48, "(f2.0)," should read -- f2.0, --.

Column 9,
Line 7, "26e ," should read -- 26e, --.

Column 12,
Line 13, "describe" should read -- described --.

Column 14,
Line 5, "circules" should read -- circles --.

Column 21,
Line 3, "apportion" should read -- a portion --.

Signed and Sealed this

Fourteenth Day of January, 2003

JAMES E. ROGAN
*Director of the United States Patent and Trademark Office*